US012239247B2

(12) United States Patent
Smith et al.

(10) Patent No.: US 12,239,247 B2
(45) Date of Patent: Mar. 4, 2025

(54) DISPLAY ASSEMBLY

(71) Applicant: ALL PLASTIC, INC., Rancho Cordova, CA (US)

(72) Inventors: William Thomas Smith, Fair Oaks, CA (US); Cheryl Ann Smith, Fair Oaks, CA (US)

(73) Assignee: ALL PLASTIC, INC., Rancho Cordova, CA (US)

( * ) Notice: Subject to any disclaimer, the term of this patent is extended or adjusted under 35 U.S.C. 154(b) by 718 days.

(21) Appl. No.: 17/225,423

(22) Filed: Apr. 8, 2021

(65) Prior Publication Data

US 2021/0219744 A1 Jul. 22, 2021

Related U.S. Application Data

(63) Continuation-in-part of application No. 29/702,730, filed on Aug. 21, 2019, now Pat. No. Des. 953,076.

(60) Provisional application No. 63/009,959, filed on Apr. 14, 2020.

(51) Int. Cl.

| | |
|---|---|
| ***A47F 7/024*** | (2006.01) |
| ***A47F 3/00*** | (2006.01) |
| ***E05B 73/00*** | (2006.01) |
| ***G09F 5/00*** | (2006.01) |

(52) U.S. Cl.

CPC .............. *A47F 3/002* (2013.01); *E05B 73/00* (2013.01); *G09F 5/00* (2013.01)

(58) Field of Classification Search

CPC .......... A47F 3/002; A47F 7/286; A47F 7/024; A47F 3/145; A47F 5/16; E05B 73/00; E05B 73/0017

USPC ....... 312/114; 211/59.3, 4, 119.005; 248/551

See application file for complete search history.

(56) References Cited

U.S. PATENT DOCUMENTS

| | | | |
|---|---|---|---|
| 1,047,366 | A | 12/1912 | Alston |
| 1,597,548 | A | 8/1926 | Sharp |
| 1,628,108 | A | 5/1927 | Brown et al. |
| 1,628,330 | A | 5/1927 | Peck et al. |
| 1,646,702 | A | 10/1927 | Moyer |
| 1,743,520 | A | 1/1930 | Baron |
| 1,883,806 | A | 10/1932 | Martin |
| D141,059 | S | 5/1945 | Siegel |
| D141,727 | S | 6/1945 | Toussaint |

(Continued)

OTHER PUBLICATIONS

Facebook publication, Bud Goblet™, dated Jan. 4, 2018, retrieved from https://www.facebook.com/BudBarDisplays/photos/a.10300742837014661/1817087991666754/?type=3&theater.

(Continued)

*Primary Examiner* — King M Chu

(57) ABSTRACT

A display assembly includes (a) a display stand having a base securable to a secure support surface and a platform detachably mounted to the base; (b) at least one display container supported atop and securely fastened to the platform, at least a portion of the container being generally transparent for viewing one or more articles containable therein for display; and (c) a locking mechanism mounted to the display stand. The locking mechanism is moveable between a locked position in which the platform is securely locked to the base to prevent detachment of the platform from the base, and an unlocked position in which the platform is unlocked from the base to permit detachment of the platform from the base for transporting the display container away from the base.

28 Claims, 16 Drawing Sheets

(56) References Cited

U.S. PATENT DOCUMENTS

| | | | | |
|---|---|---|---|---|
| 2,409,814 | A | 10/1946 | Vargish | |
| 2,434,860 | A | 1/1948 | Oxley | |
| D149,460 | S | 4/1948 | Tunstall | |
| D158,699 | S | 5/1950 | Wasilevich | |
| 3,086,658 | A | 4/1963 | Palmer | |
| 3,127,597 | A | 3/1964 | Lewin et al. | |
| D205,123 | S | 6/1966 | Giesecke | |
| 3,393,819 | A | 7/1968 | Van De Walle et al. | |
| 3,482,731 | A | 12/1969 | Douty | |
| 3,847,305 | A | 11/1974 | Tobin | |
| 3,853,263 | A | 12/1974 | Otsuka | |
| 3,964,603 | A | 6/1976 | Sandler | |
| D251,426 | S | 3/1979 | Molyneux | |
| 4,486,169 | A * | 12/1984 | Lewis | F23Q 2/34 431/253 |
| D284,777 | S | 7/1986 | Anthony | |
| D305,586 | S | 1/1990 | Wombacher | |
| D306,964 | S | 4/1990 | Zupancic | |
| D319,150 | S | 8/1991 | Biddlecom | |
| D329,558 | S | 9/1992 | Keown | |
| D329,763 | S | 9/1992 | Cuminale | |
| D349,925 | S | 8/1994 | Charron et al. | |
| D357,603 | S | 4/1995 | Wolff | |
| D362,123 | S | 9/1995 | Johnston et al. | |
| D367,560 | S | 3/1996 | Kwan | |
| D370,355 | S | 6/1996 | Kenney | |
| D372,131 | S | 7/1996 | Perkins, Jr. | |
| 5,685,436 | A | 11/1997 | Davet | |
| D393,104 | S | 3/1998 | Wolff | |
| D396,562 | S | 8/1998 | Kenney | |
| 5,794,771 | A | 8/1998 | Krawec et al. | |
| D410,052 | S | 5/1999 | Davis et al. | |
| D412,074 | S | 7/1999 | Dewitt | |
| 5,931,549 | A | 8/1999 | Lindberg | |
| D424,330 | S | 5/2000 | Dewitt | |
| D426,205 | S | 6/2000 | Knoop | |
| 6,132,123 | A | 10/2000 | Gueret | |
| D437,711 | S | 2/2001 | Berg | |
| 6,205,688 | B1 | 3/2001 | Grosser-Samuels | |
| 6,257,399 | B1 | 7/2001 | Gursky et al. | |
| D473,721 | S | 4/2003 | Chu | |
| D475,930 | S | 6/2003 | Chang | |
| D482,493 | S | 11/2003 | Lillelund et al. | |
| D499,890 | S | 12/2004 | Peck | |
| D500,640 | S | 1/2005 | Awson et al. | |
| D502,338 | S | 3/2005 | Zanghi et al. | |
| D533,330 | S | 12/2006 | Beaulieu | |
| D537,753 | S | 3/2007 | Belokin | |
| D540,068 | S | 4/2007 | Zhang | |
| D540,566 | S | 4/2007 | Scholen et al. | |
| D544,727 | S | 6/2007 | Valdez et al. | |
| D581,681 | S | 12/2008 | Goolrick | |
| D599,193 | S | 9/2009 | Meyer et al. | |
| D599,194 | S | 9/2009 | Meyer et al. | |
| D605,883 | S | 12/2009 | Hayes | |
| D607,666 | S | 1/2010 | Isbell | |
| D608,183 | S | 1/2010 | Meyer et al. | |
| D615,776 | S | 5/2010 | Bauchet | |
| D628,020 | S | 11/2010 | Lim | |
| D633,730 | S | 3/2011 | Kimmet | |
| 7,922,267 | B2 | 4/2011 | Gevaert | |
| 7,926,430 | B2 | 4/2011 | Bakker et al. | |
| D643,231 | S | 8/2011 | Huang | |
| D646,904 | S | 10/2011 | Feldstein et al. | |
| D649,153 | S | 11/2011 | Symons | |
| D649,594 | S | 11/2011 | Yi et al. | |
| D649,807 | S | 12/2011 | Stoepker | |
| 8,074,581 | B2 | 12/2011 | Epstein et al. | |
| 8,079,478 | B2 | 12/2011 | Short et al. | |
| D655,582 | S | 3/2012 | Matsumoto et al. | |
| D658,444 | S | 5/2012 | Krašovec Pogorelčnik | |
| D662,366 | S | 6/2012 | Smyers et al. | |
| 8,292,097 | B2 * | 10/2012 | Goldberg | A47F 7/024 340/568.1 |
| 8,360,373 | B2 | 1/2013 | Johnson et al. | |
| D676,852 | S | 2/2013 | Lohman | |
| D682,045 | S | 5/2013 | Myoung | |
| D683,141 | S | 5/2013 | Symons | |
| D685,610 | S | 7/2013 | Bangert | |
| 8,474,654 | B2 | 7/2013 | Snow et al. | |
| D690,137 | S | 9/2013 | Kikkert et al. | |
| D690,138 | S | 9/2013 | Kikkert et al. | |
| D693,607 | S | 11/2013 | Johnson et al. | |
| D695,845 | S | 12/2013 | Philips | |
| D696,727 | S | 12/2013 | Kim | |
| D698,641 | S | 2/2014 | Theisen et al. | |
| 8,814,128 | B2 * | 8/2014 | Trinh | F16M 13/00 340/568.2 |
| D722,794 | S | 2/2015 | Luong | |
| D729,043 | S | 5/2015 | Poppell | |
| D730,091 | S | 5/2015 | Chan | |
| D740,373 | S | 10/2015 | Martin | |
| D756,226 | S | 5/2016 | In et al. | |
| D758,847 | S | 6/2016 | Stuart et al. | |
| D759,466 | S | 6/2016 | Tonthat et al. | |
| 9,499,373 | B1 | 11/2016 | Kim | |
| D782,853 | S | 4/2017 | Foster | |
| D784,737 | S | 4/2017 | Kroll | |
| 9,615,677 | B2 | 4/2017 | Trinh et al. | |
| 9,625,058 | B2 | 4/2017 | Kim | |
| 9,630,747 | B2 | 4/2017 | Smith et al. | |
| D785,977 | S | 5/2017 | Kroll | |
| D786,668 | S | 5/2017 | Cornaglia | |
| D787,840 | S | 5/2017 | Spigler | |
| D789,180 | S | 6/2017 | Webb | |
| D789,348 | S | 6/2017 | Kim | |
| RE46,460 | E | 7/2017 | Kroll | |
| 9,700,155 | B1 | 7/2017 | Theisen et al. | |
| 9,744,546 | B2 | 8/2017 | Cvetan et al. | |
| 9,747,765 | B1 | 8/2017 | Berglund et al. | |
| 9,788,669 | B1 | 10/2017 | Denby et al. | |
| D806,450 | S | 1/2018 | Seong | |
| D807,086 | S | 1/2018 | Tio et al. | |
| D812,939 | S | 3/2018 | Modlin | |
| D812,946 | S | 3/2018 | Chang et al. | |
| D813,576 | S | 3/2018 | Schwalbach et al. | |
| D814,831 | S | 4/2018 | Modlin | |
| D824,702 | S | 8/2018 | Tio et al. | |
| D827,923 | S | 9/2018 | Whetsel et al. | |
| D830,744 | S | 10/2018 | Kroll | |
| D834,356 | S | 11/2018 | Chapuis et al. | |
| D838,525 | S | 1/2019 | Guo | |
| D842,627 | S | 3/2019 | Siminoff et al. | |
| D842,628 | S | 3/2019 | Siminoff et al. | |
| D843,139 | S | 3/2019 | Burton et al. | |
| D845,681 | S | 4/2019 | Bestard | |
| D846,922 | S | 4/2019 | Akana et al. | |
| D848,819 | S | 5/2019 | French | |
| D850,165 | S | 6/2019 | Eads et al. | |
| D851,459 | S | 6/2019 | Mcgill | |
| 10,323,440 | B1 | 6/2019 | Kelsch | |
| D855,358 | S | 8/2019 | Adler et al. | |
| D855,449 | S | 8/2019 | Smith et al. | |
| D856,045 | S | 8/2019 | Schwalbach et al. | |
| D856,046 | S | 8/2019 | Akana et al. | |
| 10,384,834 | B2 | 8/2019 | Smith et al. | |
| D859,894 | S | 9/2019 | Smith et al. | |
| D861,392 | S | 10/2019 | Pedersen et al. | |
| D863,053 | S | 10/2019 | Smith et al. | |
| D865,413 | S | 11/2019 | Chapuis et al. | |
| D870,496 | S | 12/2019 | Mesny-Deschamps | |
| D875,443 | S | 2/2020 | Corbo et al. | |
| D876,945 | S | 3/2020 | Smith et al. | |
| D877,548 | S | 3/2020 | Brugger et al. | |
| D878,826 | S | 3/2020 | Smith et al. | |
| D878,827 | S | 3/2020 | Smith et al. | |
| D880,462 | S | 4/2020 | Nakamura | |
| D884,461 | S | 5/2020 | Allen et al. | |
| D887,184 | S | 6/2020 | Tsuchiyama | |
| D887,383 | S | 6/2020 | Wang et al. | |
| 10,687,619 | B2 | 6/2020 | Abramov | |
| D889,887 | S | 7/2020 | Dejesus et al. | |
| D891,253 | S | 7/2020 | Smith et al. | |
| 10,722,051 | B2 | 7/2020 | Dietlin | |

(56) References Cited

U.S. PATENT DOCUMENTS

| | | | |
|---|---|---|---|
| D893,923 | S | 8/2020 | Brugger et al. |
| D897,138 | S | 9/2020 | Thain et al. |
| D898,490 | S | 10/2020 | Schwalbach et al. |
| 10,803,718 | B2 | 10/2020 | Sankey |
| D900,511 | S | 11/2020 | Feder et al. |
| D900,512 | S | 11/2020 | Ouyang |
| D900,514 | S | 11/2020 | Li |
| D901,948 | S | 11/2020 | Burton et al. |
| D908,484 | S | 1/2021 | Smith et al. |
| D911,754 | S | 3/2021 | Bestard |
| D913,021 | S | 3/2021 | Ouyang |
| D914,405 | S | 3/2021 | Denby |
| D914,412 | S | 3/2021 | Angeles |
| D917,235 | S | 4/2021 | Manska et al. |
| D917,936 | S | 5/2021 | Brugger et al. |
| D917,937 | S | 5/2021 | Dejesus et al. |
| D923,982 | S | 7/2021 | Thain et al. |
| D939,933 | S | 1/2022 | Campbell |
| D953,183 | S | 5/2022 | Dong et al. |
| D965,355 | S | 10/2022 | Fink et al. |
| D1,012,682 | S | 1/2024 | Huang |
| D1,013,382 | S | 2/2024 | Rutsche et al. |
| D1,019,348 | S | 3/2024 | Palmer et al. |
| D1,020,827 | S | 4/2024 | Ando et al. |
| 2002/0030025 | A1 | 3/2002 | Sipe |
| 2006/0000955 | A1 | 1/2006 | Cvek |
| 2007/0051826 | A1 | 3/2007 | Schofield |
| 2007/0152545 | A1 | 7/2007 | Tranter et al. |
| 2008/0023347 | A1 | 1/2008 | Wahl et al. |
| 2009/0161373 | A1 | 6/2009 | Teng et al. |
| 2009/0275000 | A1 | 11/2009 | Jung et al. |
| 2010/0282924 | A1 | 11/2010 | Boies |
| 2011/0062294 | A1 | 3/2011 | Johnson et al. |
| 2011/0309928 | A1 | 12/2011 | Henson et al. |
| 2013/0306516 | A1 | 11/2013 | Dougherty et al. |
| 2014/0027390 | A1* | 1/2014 | Reynolds ................ A47F 7/024 248/551 |
| 2014/0106608 | A1 | 4/2014 | Howarth et al. |
| 2014/0120481 | A1* | 5/2014 | Buchbinder ............ F23Q 2/167 431/131 |
| 2014/0152441 | A1 | 6/2014 | Tinti |
| 2014/0159898 | A1 | 6/2014 | Wheeler et al. |
| 2015/0091729 | A1 | 4/2015 | Phillips et al. |
| 2015/0208826 | A1* | 7/2015 | Yang .................... F16M 11/041 248/316.1 |
| 2016/0031605 | A1 | 2/2016 | Bean et al. |
| 2016/0223126 | A1 | 8/2016 | Mireles |
| 2018/0049563 | A1 | 2/2018 | Henson et al. |
| 2018/0134447 | A1 | 5/2018 | Zimmer |
| 2018/0160828 | A1 | 6/2018 | Turner et al. |
| 2018/0213946 | A1 | 8/2018 | Vanos et al. |
| 2018/0282011 | A1 | 10/2018 | Evans |
| 2018/0322748 | A1 | 11/2018 | Henson et al. |
| 2020/0113353 | A1* | 4/2020 | Bigioni .................. A47F 7/286 |
| 2020/0146422 | A1 | 5/2020 | Kamboj |
| 2021/0244201 | A1 | 8/2021 | Galant |

OTHER PUBLICATIONS

Facebook publication, Sampling table + Bud Goblet™, dated Apr. 20, 2018, retrieved from https://www.facebook.com/BudBarDisplays/photos/a.1030074283701466/1960976007277951/?type=3&theater.

Website photo, Jar Display Light Bar, www.budbardisplays.com, Approx. publication date: Oct. 5, 2011, 1 page.

Website photo, Canna-Pod Jar Bar Display, www.budbardisplays.com, Approx. publication date: Sep. 19, 2017, 1 page.

* cited by examiner

DISPLAY ASSEMBLY

CROSS-REFERENCE TO RELATED APPLICATIONS

This application claims the benefit of priority to U.S. Provisional Application No. 63/009,959, filed on Apr. 14, 2020, and is a continuation-in-part application of U.S. patent application Ser. No. 29/702,730, filed on Aug. 21, 2019, each of which are hereby incorporated herein by reference in their entireties.

FIELD

The specification relates generally to secure display of articles, and more specifically, to display assemblies for securely displaying articles.

BACKGROUND

U.S. Pat. No. 9,630,747 B2 (Smith et al.) discloses a container for displaying, visualizing, and aroma sampling botanical materials—such as tea, cannabis, and the like including a container body, lid, and lens. The container body is shaped to define a mounting projection wherein a sample, such as a botanical sample, may be held. Container body and lid form an airtight seal. A sample may be visualized through the lens. In a preferred embodiment, lid is shaped to define scent openings permitting aroma sampling of a sample contained within. In one embodiment option, one or more projections secure a card bearing sample identification information.

SUMMARY

The following summary is intended to introduce the reader to various aspects of the applicant's teaching, but not to define any invention.

According to some aspects, a display assembly includes: (a) a display stand including a base securable to a secure support surface and a platform detachably mounted to the base; (b) at least one display container supported atop and securely fastened to the platform, at least a portion of the display container being generally transparent for viewing one or more articles containable therein for display; and (c) a locking mechanism mounted to the display stand. The locking mechanism is moveable between a locked position in which the platform is securely locked to the base to prevent detachment of the platform from the base, and an unlocked position in which the platform is unlocked from the base to permit detachment of the platform from the base for transporting the display container away from the base.

In some examples, the base includes one or more mounting features for securing the base to the support surface, the mounting features inaccessible when the base is secured to the support surface and the platform is mounted to the base, and the mounting features accessible when the platform is detached from the base.

In some examples, the mounting features include a plurality of holes for receiving fasteners, the holes extending through the base between an underside surface of the base positionable over the support surface and a topside surface of the base, the holes covered by the platform when the platform is mounted to the base and exposed when the platform is detached from the base.

In some examples, the display assembly further includes at least one retractable tether securely fastening the display container to the platform, the retractable tether permitting limited movement of the display container away from the platform to facilitate viewing of the articles and urging the display container back to the platform.

In some examples, the display stand has a generally enclosed interior bounded by the base and the platform, and at least one tether port extending between the interior and an exterior of the display stand. The retractable tether is mounted to the platform in the interior and extends through the tether port to the display container.

In some examples, the retractable tether comprises a retraction mechanism mounted in the interior and a tether line extending through the tether port between a proximal end coupled to the retraction mechanism and a distal end fixed to the display container.

In some examples, the display container extends along a container axis between a top portion and a bottom portion vertically opposite the top portion, the top portion comprising a generally transparent viewing surface normal to the container axis and through which the articles are viewable.

In some examples, the platform comprises at least one seat shaped for supporting the bottom portion of the display container.

In some examples, when the display container is in the seat, the seat and the retractable tether cooperate to hold the display container at an angled orientation, in which the viewing surface is inclined from horizontal toward the front of the display stand.

In some examples, the bottom of the display container has a generally hemispherical shape, and the seat has an arcuate curvature corresponding to the hemispherical shape.

In some examples, the viewing surface comprises a viewing lens.

In some examples, the locking mechanism includes a latch movably mounted to one of the base and the platform, and a strike surface fixed relative to the other one of the base and the platform, the latch positioned for engagement with the strike surface when the locking mechanism is in the locked position to prevent detachment of the platform from the base, and the latch clear of the strike surface when the locking mechanism is in the unlocked position to permit detachment of the platform from the base.

In some examples, the locking mechanism includes a key slot for receiving a key to move the locking mechanism between the locked and unlocked positions.

In some examples, the base includes a track extending along a track axis and the platform is slidably mounted on the track for constraining movement of the platform to along the track axis.

In some examples, the display assembly further includes an information display system supported by the display stand for displaying information about the articles in the display container.

According to some aspects, a display assembly includes: (a) a display stand including a base securable to a secure support surface and a platform detachably mounted to the base; (b) a plurality of display containers supported atop the platform, at least a portion of each display container being generally transparent for viewing one or more articles containable therein for display; (c) a plurality of retractable tethers mounted to the platform, each tether securely fastening a corresponding display container to the platform, each tether permitting limited movement of the corresponding display container away from the platform and urging the display container back toward the platform; and (d) a locking mechanism mounted to the display stand, the locking mechanism moveable between a locked position in which the platform is securely locked to the base to prevent detachment of the platform from the base, and an unlocked position in which the platform is unlocked from the base to permit detachment of the platform from the base for transporting the display containers away from the base.

In some examples, the display stand has a generally enclosed interior bounded by the base and the platform, and a plurality of tether ports extending between the interior and an exterior of the display stand. The retractable tethers are mounted to the platform in the interior and each tether extends through a corresponding tether port to a corresponding display container.

In some examples, the platform comprises a plurality of seats, each seat shaped for supporting a corresponding display container.

According to some examples, a display assembly includes: (a) a housing having a generally enclosed interior; (b) at least one display container adjacent the housing, at least a portion of the display container being generally transparent for viewing one or more articles containable therein for display; (c) at least one tether port extending through the housing between the interior and an exterior of the housing; and (d) at least one retractable tether mounted in the interior of the housing, the retractable tether extending through the tether port and fastening the display container to the housing, the tether permitting limited movement of the display container away from the housing to facilitate viewing of the articles, and urging the display container back toward the housing.

In some examples, the housing includes a first portion securable to a secure support surface and a second portion detachably mounted to the first portion, the first and second portions bounding the interior of the housing. The tether port is provided in the second portion of the housing and the retractable tether is mounted to the second portion.

In some examples, the first portion includes one or more mounting features for securing the base to the secure support surface, the mounting features inaccessible when the first portion is secured to the support surface and the second portion is mounted to the first portion, and the mounting features accessible when the second portion is detached from the first portion.

In some examples, the display assembly further includes a locking mechanism mounted to the housing. The locking mechanism is moveable between a locked position in which the second portion is securely locked to the first portion to prevent detachment of the second portion from the first portion, and an unlocked position in which the second portion is unlocked from the first portion to permit detachment of the second portion from the first portion for transporting the second portion, tethers, and display containers away from the first portion.

According to some aspects, a display assembly includes: (a) a display stand including a base securable to a secure support surface and a platform detachably mounted to the base; (b) a plurality of display containers fastened to the platform, at least a portion of each display container being generally transparent for viewing one or more articles containable therein for display; and (c) a locking mechanism mounted to the housing. The locking mechanism is moveable between a locked position in which the platform is securely locked to the base to prevent detachment of the platform from the base, and an unlocked position in which the platform is unlocked from the base to permit detachment of the platform from the base for transporting the display containers away from the base.

BRIEF DESCRIPTION OF THE DRAWINGS

The drawings included herewith are for illustrating various examples of apparatuses, articles, and methods of the present specification and are not intended to limit the scope of what is taught in any way. In the drawings.

DETAILED DESCRIPTION

Various apparatuses, articles, or processes will be described below to provide an example of an embodiment of each claimed invention. No embodiment described below limits any claimed invention and any claimed invention may cover apparatuses, articles, or processes that differ from those described below. The claimed inventions are not limited to apparatuses, articles, or processes having all of the features of any one apparatus, article, or process described below or to features common to multiple or all of the apparatuses, articles, or processes described below. It is possible that an apparatus, article, or process described below is not an embodiment of any claimed invention. Any invention disclosed in an apparatus, article, or process described below that is not claimed in this document may be the subject matter of another protective instrument, for example, a continuing patent application, and the applicants, inventors, or owners do not intend to abandon, disclaim, or dedicate to the public any such invention by its disclosure in this document.

In retail or other environments, it may be desirable or necessary to display articles for sale in secure display containers. The containers can be locked and tamper-proof to prevent patrons from touching the articles being displayed therein. The containers may also be fastened to a secure surface at a display location through, for example, a tether to allow patrons to handle and manipulate the display containers for viewing and/or sampling an aroma of the articles contained therein while deterring theft or misplacement of the containers. The present application discloses examples of display assemblies for securely displaying articles in secure display containers fastened at a display location. The display assemblies can allow for convenient detachment and reattachment of the display containers for transport away from and back to the display (or other) location. This can facilitate, for example, servicing, replacement, and/or more secure storage (e.g. during store closure, overnight, etc.) of the display containers and/or articles contained therein. The articles can include, for example, aromatic botanical specimens such as, for example, cannabis specimens.

Figure 1:
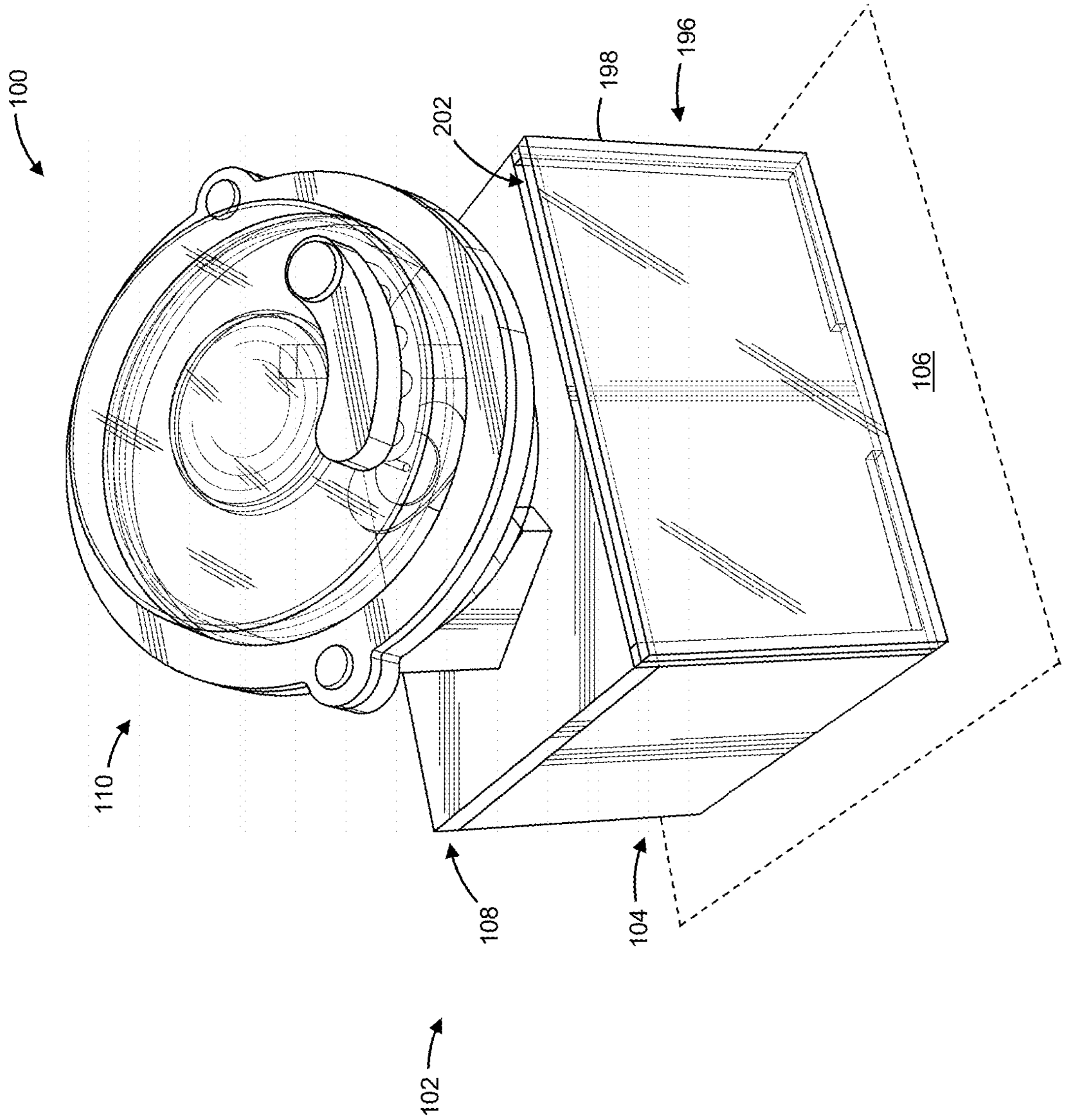
FIG. 1 is a perspective view from the front and top of an example display assembly.

Referring to FIG. 1, an example display assembly 100 for secure display of one or more articles is illustrated. In the example illustrated, the display assembly 100 includes a display stand 102 having a first portion (in the form of a base 104 in the example illustrated) securable to a secure support surface 106 (shown schematically in FIG. 1) and a second portion (in the form of a platform 108 in the example illustrated) detachably mounted to the base 104. The support surface 106 can comprise a permanent and/or semi-permanent fixture or structure such as, for example, a counter, table, and/or other construction to which the display assembly 100 can be securely mounted to prevent removal of the display assembly 100 from the premises while on display.

Still referring to FIG. 1, in the example illustrated, the display assembly 100 further includes at least one display container 110 adjacent the display stand 102. In the example illustrated, the display container 110 is supported atop and fastened to the platform 108. The display container 110 has a generally enclosed container interior 112 (FIG. 8) for containing one or more articles 50 (shown schematically in FIG. 8) for display, and in the example illustrated, is locked and tamper-proof to prevent patrons from touching the articles 50 being displayed therein. At least a portion of the container 110 is generally transparent to allow for viewing of the articles 50 contained therein.

Figure 5:
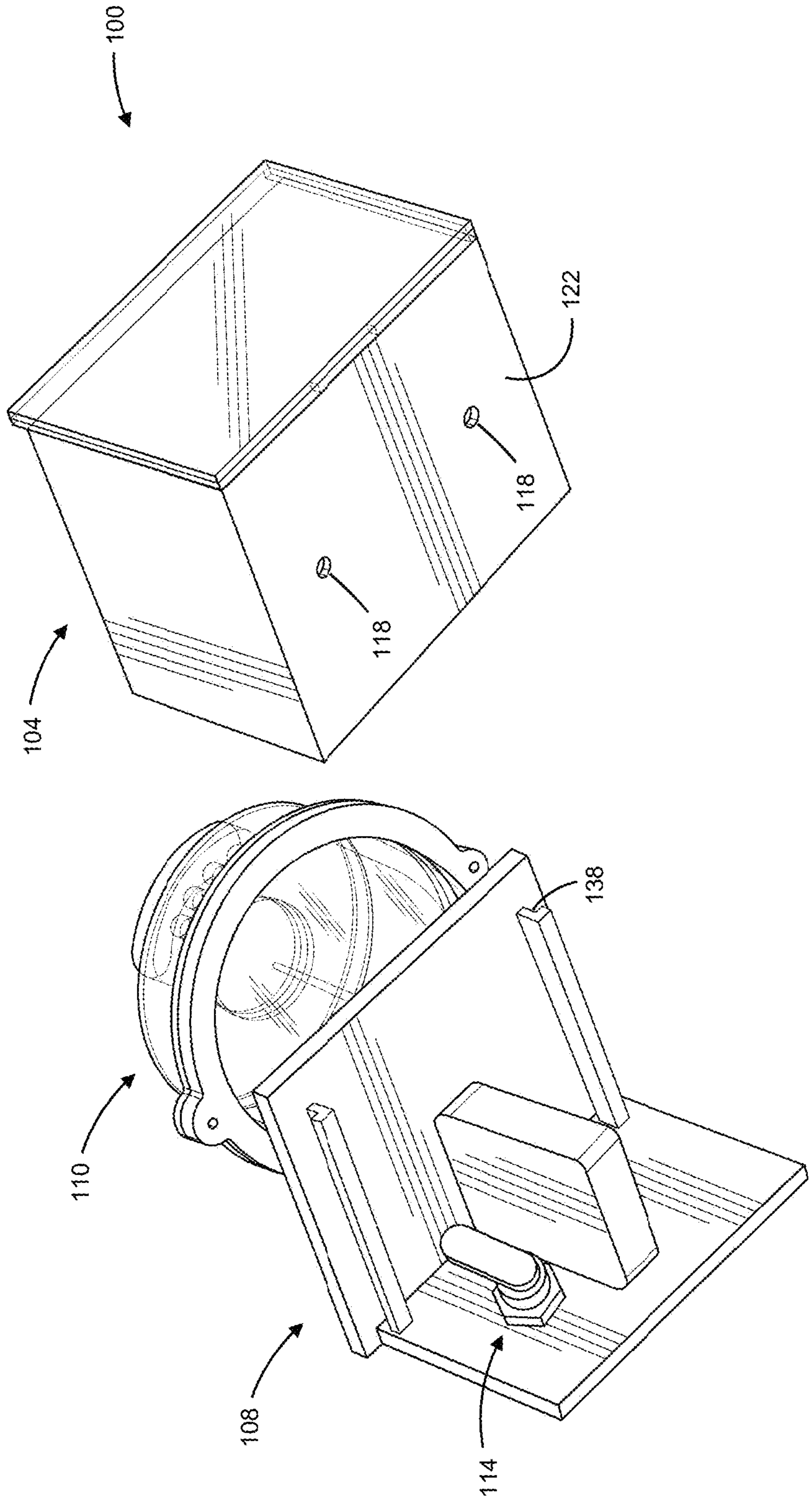
FIG. 5 is a partially exploded perspective view from the front and bottom showing the platform portion detached from the base portion of the display assembly of FIG. 1.

Referring to FIG. 5, in the example illustrated, the display assembly 100 further includes a locking mechanism 114 mounted to the display stand 102. The locking mechanism is moveable between a locked position (shown in FIG. 6 in solid lines) and an unlocked position (shown in FIG. 6 in dashed lines). When the locking mechanism 114 is in the locked position, the platform 108 is securely locked to the base 104 to prevent detachment of the platform 108 from the base 104, which can help prevent removal of the display containers fastened to the platform from the premises. When the locking mechanism 114 is in the unlocked position, the platform 108 is unlocked from the base 104 to permit detachment of the platform 108 from the base 104 for transporting the platform 108 and the display container 110 fastened to the platform 108 away from the base 104. This can allow for the display container 110 to be securely displayed at a predetermined display location where the base 104 is mounted, and for convenient detachment and reattachment of the platform 108 and display container 110 for transport away from and back to the display location, which can facilitate servicing, replacement, and/or more secure storage (e.g. during store closure, overnight, etc.) of the display container 110 and articles 50 contained therein.

Figure 4:
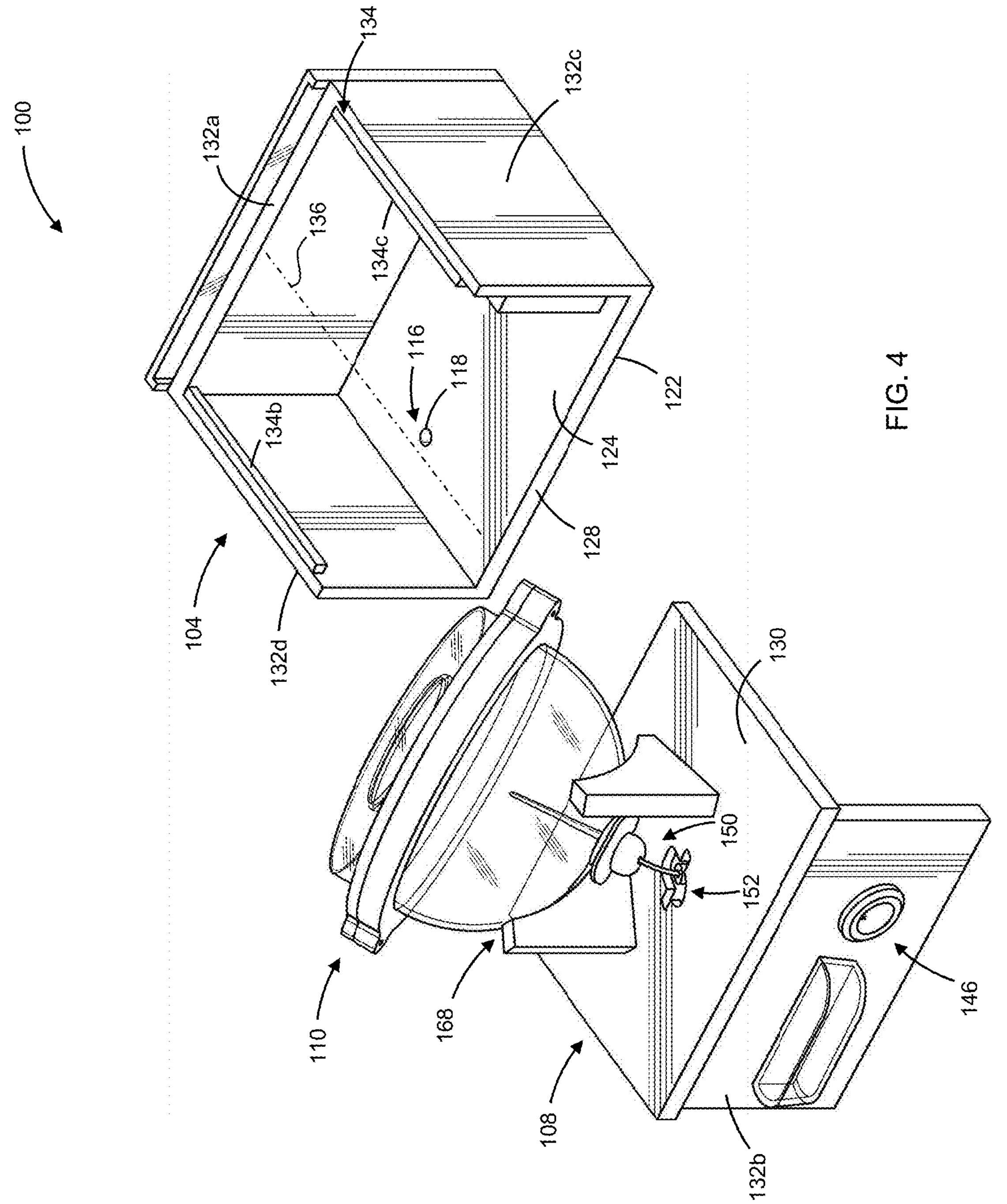
FIG. 4 is a partially exploded perspective view from the rear and top showing a platform portion detached from a base portion of the display assembly of FIG. 1.

Referring to FIG. 4, in the example illustrated, the base 104 includes one or more mounting features 116 for securing the base 104 to the support surface 106. The mounting features 116 are inaccessible when the base 104 is secured to the support surface 106 and the platform 108 is mounted to the base 104 (see e.g. FIG. 1). The mounting features 116 are accessible when the platform 108 is detached from the base. This can help inhibit tampering of the mounting features 116 by blocking access to the mounting features 116 when the platform 108 (and display container 110) is locked to the base 104, and by providing access to the mounting features 116 only when the platform 108 is unlocked and (at least partially) removed from the base 104.

In the example illustrated, the mounting features 116 include a plurality of mounting holes 118 for receiving fasteners 120 (e.g. screws or bolts; shown schematically in FIG. 6) to secure the base 104 to the support surface 106 (FIG. 1). In the example illustrated, the mounting holes 118 extend through the base 104 between an underside surface 122 of the base 104 positionable over the support surface 106 and a topside surface 124 of the base 104 opposite the underside surface 122. In the example illustrated, the topside surface 124 of the base 104 and the holes 118 are covered by the platform 108 when the platform 108 is mounted to the base 104, and the topside surface 124 and the holes 118 (and fasteners 120 when the base 104 is secured to the support surface 106) are exposed when the platform 108 is detached from the base 104.

Figure 6:
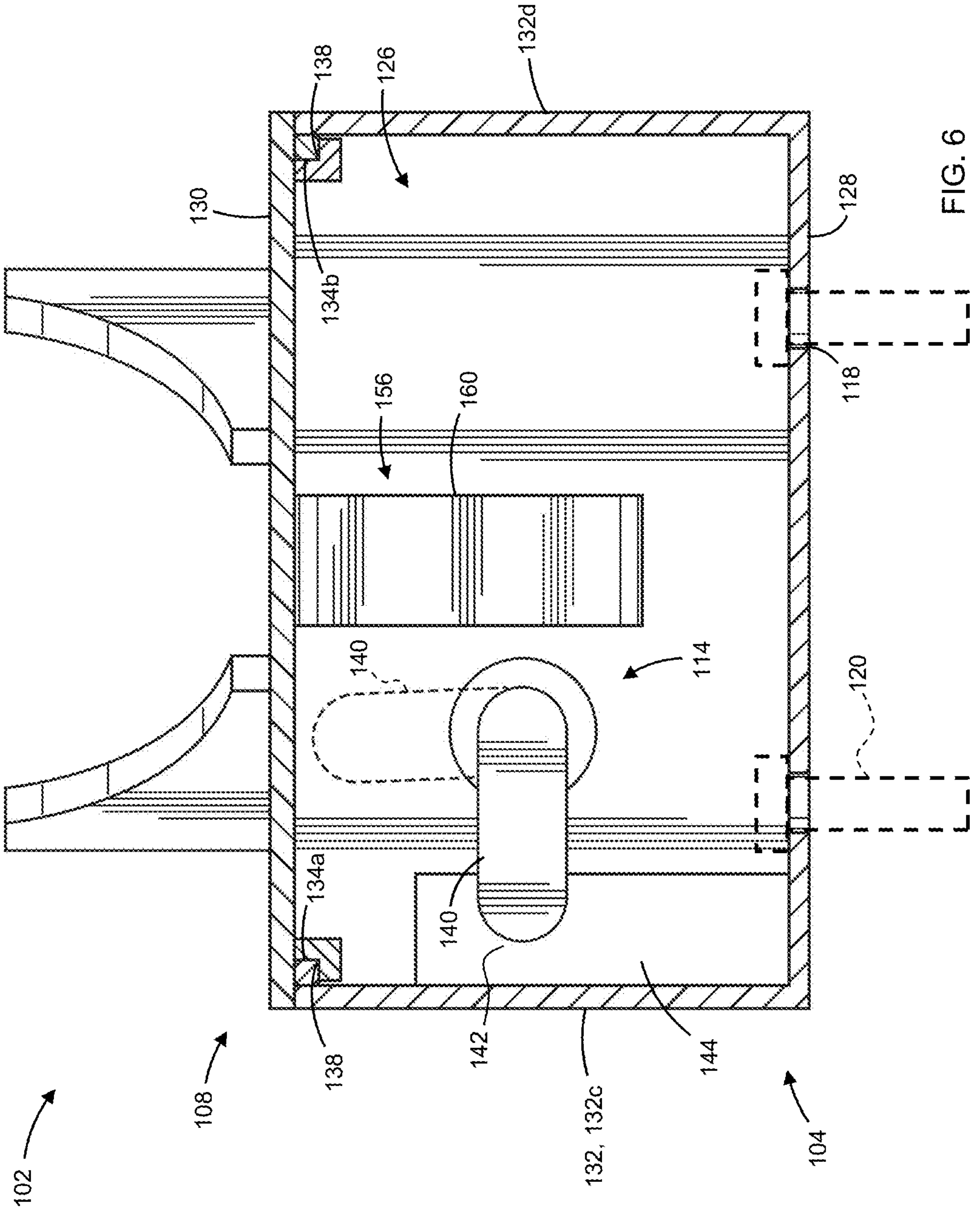
FIG. 6 is a cross-sectional view of a display stand portion of the display assembly of FIG. 1, taken along line 6-6 in FIG. 2.

Referring to FIG. 6, in the example illustrated, the display stand 102 comprises a housing having a generally enclosed interior 126 bounded by the base 104 and the platform 108. In the example illustrated, the display stand 102 has a bottom wall 128 at a bottom of the display stand 102 and bounding the interior 126 from below, a top wall 130 vertically opposite the bottom wall 128 at a top of the display stand 102 and bounding the interior 126 from above, and a sidewall 132 extending vertically between the bottom and top walls 128, 130 and bounding the interior 126 horizontally. Referring to FIGS. 4 and 5, in the example illustrated, the sidewall 132 includes a sidewall front portion **132*a* at a front of the display stand 102, a sidewall rear portion 132*b* axially opposite the sidewall front portion 132*a* and at a rear of the display stand 102, a sidewall left portion 132*c* extending between the sidewall front and rear portions 132*a*, 132*b* on a left side of the display stand 102, and a sidewall right portion 132*d* extending between the sidewall front and rear portions 132*a*, 132*b* on a right side of the display stand laterally opposite the left side. In the example illustrated, the base 104 comprises the bottom wall 128, sidewall front portion 132*a*, sidewall left portion 132*c*, and sidewall right portion 132*d*, and the platform 108 comprises the top wall 130 and the sidewall rear portion 132*b*. In the example illustrated, the mounting holes 118 extend through the bottom wall 128 of the base 104 and are open to the interior 126**.

Referring to FIG. 4, in the example illustrated, the base 104 includes a track 134 extending along a track axis 136, and the platform 108 is slidably mounted on the track 134. Referring to FIG. 5, in the example illustrated, the platform 108 includes one or more track engagement surfaces 138 for interlocking with the track 134 to constrain movement of the platform 108 to along the track axis 136 (and inhibit movement of the platform 108 in a direction transverse to the track axis 136) when the platform 108 is slidably mounted on the track 134. In the example illustrated, the track 134 (and track axis 136) extends axially between the front and rear of the display stand 102. Referring to FIG. 6, in the example illustrated, the track 134 includes a first guide surface 134*a* fixed relative to the sidewall left portion 132*c* and a second guide surface 134*b* fixed relative to the sidewall right portion 132*d*. In the example illustrated, each guide surface 134*a*, 134*b* comprises a rail extending along the track axis 136 and projecting laterally into the interior 126 of the display stand 102. In the example illustrated, each track engagement surface 138 defines a groove slidable over a respective rail and is fixed relative to the top wall 130 of the platform 108.

In the example illustrated, when the platform 108 is mounted to the base 104 and the locking mechanism 114 is in the locked position, the track 134 prevents movement of the platform 108 in the direction transverse to the track axis 136 and the locking mechanism 114 prevents movement of the platform 108 along the track axis 136. When the locking mechanism 114 is in the unlocked position, the platform 108 is movable along the track axis 136 for detachment from the base 104.

Referring to FIG. 6, in the example illustrated, the locking mechanism 114 includes a latch 140 movably mounted to one of the base 104 and the platform 108, and a strike surface 142 fixed relative to the other one of the base 104 and the platform 108. The latch 140 is positioned for engagement with the strike surface 142 when the platform 108 is mounted to the base 104 and the locking mechanism 114 is in the locked position, to prevent detachment of the platform 108 from the base 104. The latch 140 is clear of the strike surface 142 when the locking mechanism 114 is in the unlocked position to permit the platform 108 to be mounted to and detached from the base 104. In the example illustrated, the latch 140 is mounted to the platform 108 and the strike surface 142 is fixed relative to the base 104. In the example illustrated, the strike surface 142 comprises a strike plate 144 fixed to the sidewall 132 and projecting laterally into the interior 126 of the display stand 102. Referring to FIG. 4, in the example illustrated, the locking mechanism 114 includes a key slot 146 for receiving a key to move the locking mechanism 114 (in particular, the latch 140 in the example illustrated) between the locked and unlocked positions. In the example illustrated, the latch 140 and key slot 146 are mounted to the sidewall rear portion 132*b*. The key slot 146 is accessible from the rear of the display assembly 100, and the latch 140 is in the interior 126 when the platform 108 is mounted to the base 104.

Figure 2:
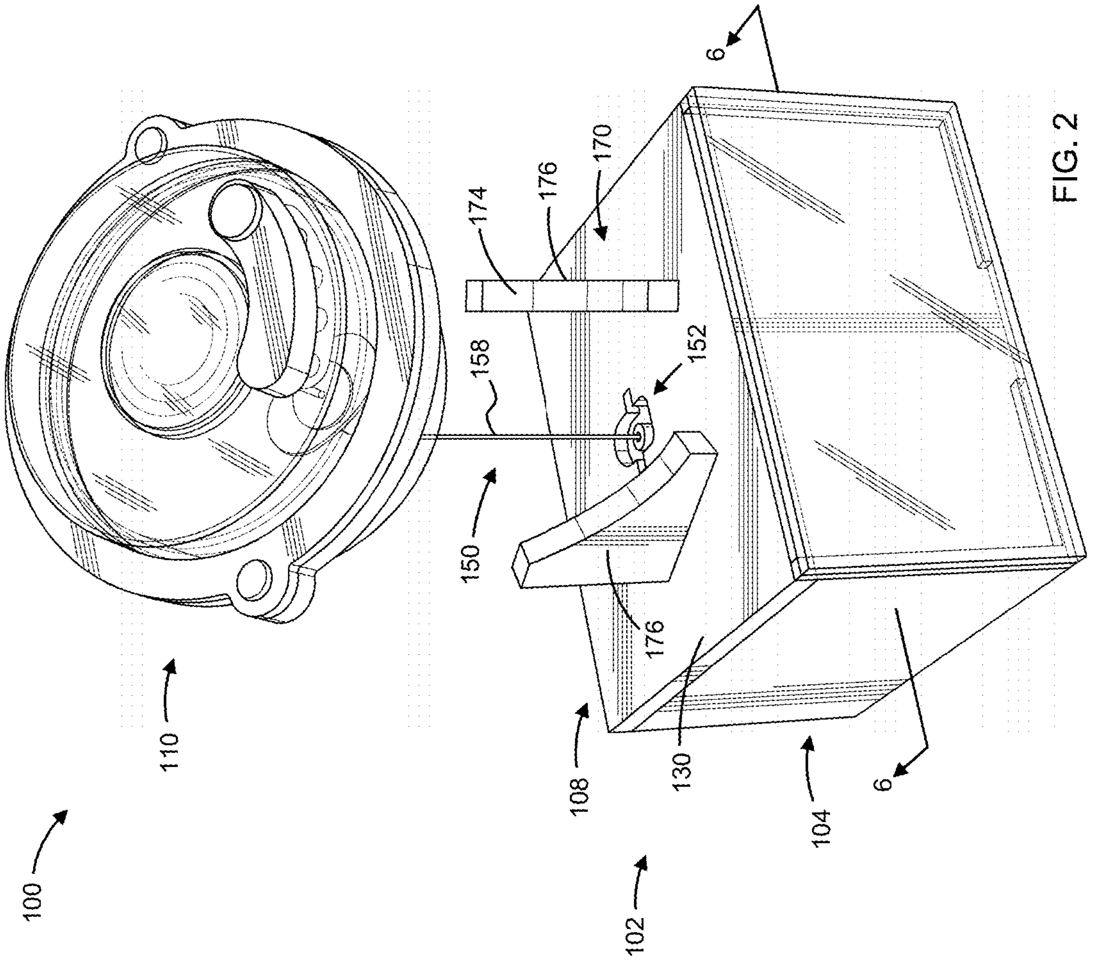
FIG. 2 is a perspective view like that of FIG. 1, but with a display container shown raised above a platform portion of the display assembly of FIG. 1.

Referring to FIG. 2, in the example illustrated, the display assembly 100 further includes at least one retractable security tether 150 securely fastening the display container 110 to the platform 108. The retractable tether 150 permits limited movement of the display container 110 away from the platform 108 to facilitate viewing of the articles 50 therein, and urges the display container 110 back to the platform 108. In the example illustrated, the retractable tether 150 holds the display container 110 adjacent the platform 108.

In the example illustrated, the display assembly 100 includes at least one tether port 152 extending between the interior 126 and an exterior of the display stand 102. In the example illustrated, the retractable tether 150 is mounted to the platform 108 in the interior 126 (FIG. 6) and extends through the tether port 152 to the display container 110. In the example illustrated, the tether port 152 passes through the top wall 130 of the platform 108.

Referring to FIG. 6, in the example illustrated, the retractable tether 150 comprises a retraction mechanism 156 mounted in the interior 126 and a tether line 158 (in the form of a cable, in the example illustrated-see FIG. 2) extending through the tether port 152 between a proximal end coupled to the retraction mechanism 156 and a distal end secured to the display container 110. The distal end can be secured to the display container 110 through, for example, a loop and fastener connection, adhesive, and/or in any other suitable manner.

Referring to FIG. 2, in the example illustrated, the tether line 158 is extendible from the retraction mechanism 156 to accommodate movement of the display container 110 away from the platform 108, and the retraction mechanism 156 urges retraction of the tether line 158 back into the retraction mechanism 156 for returning the display container 110 back to the platform 108. Referring to FIG. 6, in the example illustrated, the retraction mechanism 156 includes a casing 160 mounted in the interior 126 to an inner surface of the platform 108, a spring-loaded reel in the casing 160 and around which the tether line 158 is wound for urging retraction of the tether line 158 into the casing 160, and a casing opening through which the tether line 158 extends from within the casing 160. In the example illustrated, the retractable tether 150 is mounted to an underside of the platform 108, and the casing opening is in alignment with the tether port 152.

Figure 8:
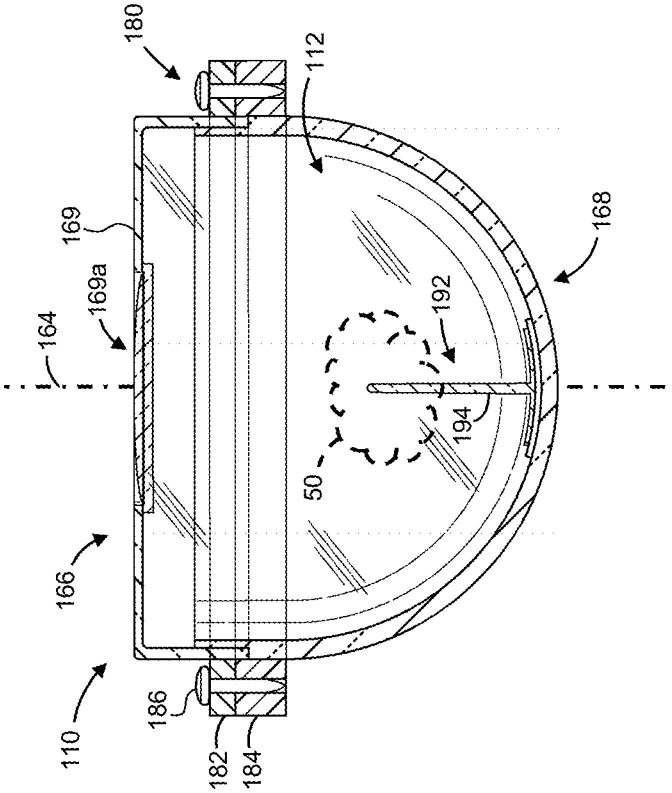
FIG. 8 is a cross-sectional view of the display container of FIG. 7, taken along line 8-8 in FIG. 7.

Referring to FIG. 8, in the example illustrated, the display container 110 extends along a container axis 164 between a top portion 166 and a bottom portion 168 vertically opposite the top portion. The top and bottom portions 166, 168 generally enclose the interior 112 of the container 110. In the example illustrated, the top portion 166 comprises a generally transparent viewing surface 169 normal to the container axis 164 and through which articles 50 in the container 110 can be viewed. In the example illustrated, the viewing surface 169 comprises a viewing lens 169*a* for viewing the articles 50 in the display container 110. In the example illustrated, the bottom portion 168 is also generally transparent.

Figure 3:
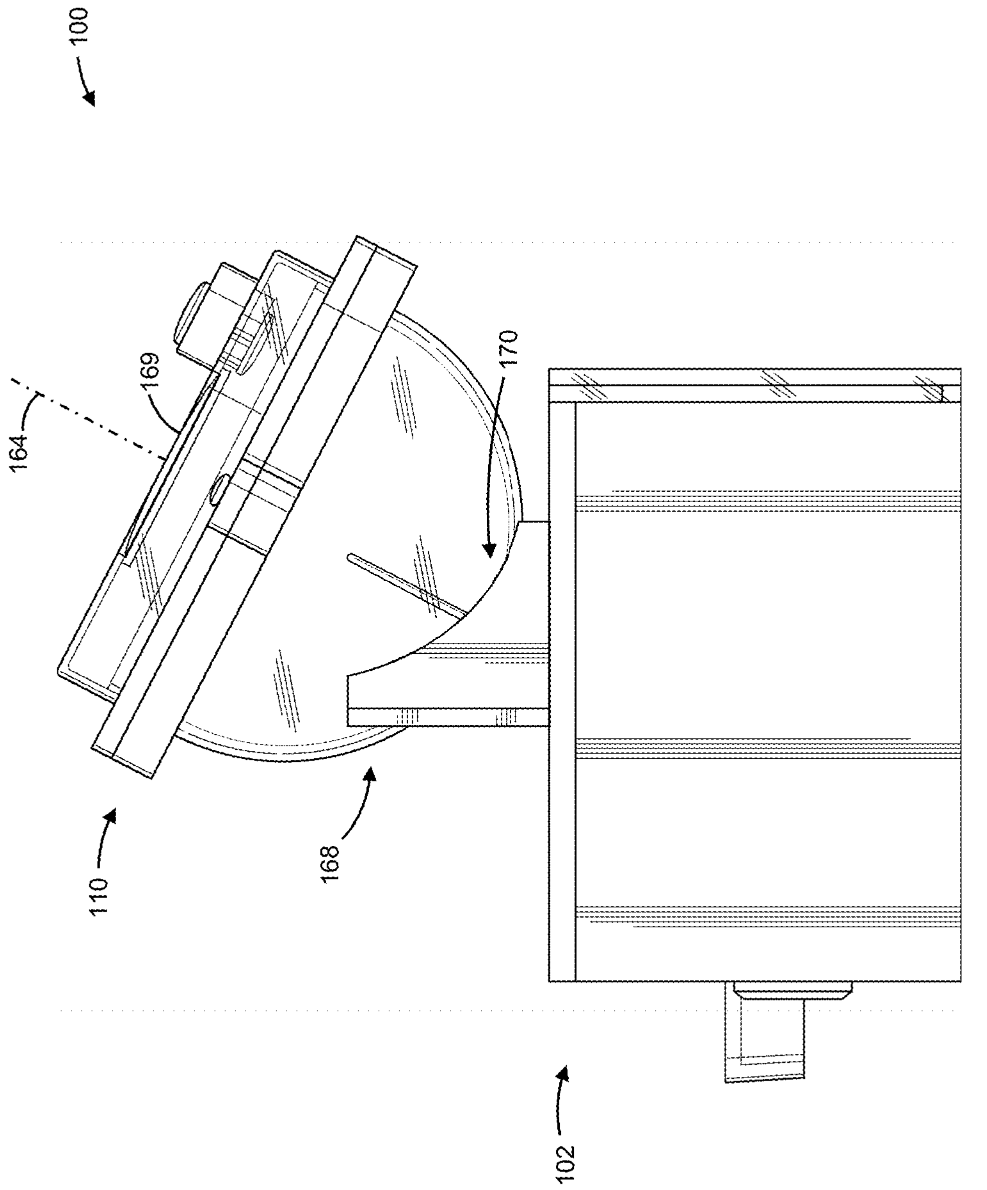
FIG. 3 is a side elevation view of the display assembly of FIG. 1.

Referring to FIG. 3, in the example illustrated, the platform 108 includes at least one seat 170 shaped for supporting the bottom portion 168 of the display container 110. In the example illustrated, when the display container 110 is in the seat 170, the seat 170 and the retractable tether 150 cooperate to hold the display container 110 at an angled orientation, in which the viewing surface 169 is inclined from horizontal toward the front of the display stand 102 (and in which the container axis 164 is oriented at an oblique angle from vertical). This can help orient the viewing surface 169 toward patrons when the display container 110 is in the seat 170 to facilitate presentation and display of the articles 50.

Referring to FIG. 2, in the example illustrated, the seat 170 comprises a seating surface 174 for engagement with the bottom portion 168 of the display container 110 when in the seat 170. Referring to FIG. 4, in the example illustrated, the tether 150 is fastened to a bottom end at the bottom portion 168 of the display container 110 adjacent the container axis 164, and the tether port 152 is positioned generally rearward of and at an elevation below the seating surface 174 so that the tether 150 pulls the bottom portion 168 downwardly and rearwardly into the seat 170 and urges the display container 110 into the angled orientation.

In the example illustrated, the bottom portion 168 of the display container 110 has a generally hemispherical shape, and the seat 170 has an arcuate curvature corresponding to the hemispherical shape. Referring to FIG. 2, in the example illustrated, the seat 170 projects upwardly from the top wall 130 of the platform 108. In the example illustrated, the seat 170 comprises a pair of laterally spaced apart support members 176 projecting upwardly from the top wall 130. In the example illustrated, the tether port 152 is laterally intermediate the support members 176.

Referring to FIG. 8, in the example illustrated, the top portion 166 of the container 110 comprises a lid 178 and is detachably locked to the bottom portion 168 of the container 110. In the example illustrated, the container 110 includes a locking ring 180 for detachably locking the top portion 166 to the bottom portion 168. In the example illustrated, the locking ring 180 includes a ring first portion 182 fixed relative to the top portion 166 of the container 110 (through an adhesive, for example) and a ring second portion 184 fixed relative to the bottom portion 168 of the container 110. In the example illustrated, the ring first portion 182 is locked to the ring second portion 184 with one or more removable fasteners 186 (e.g. screws) to inhibit tampering and/or unauthorized opening of the display container 110. The fasteners 186 can be removed to detach the top portion 166 of the container 110 from the bottom portion 168 for opening the display container 110 to insert or remove the article 50 from the interior 112 of the display container 110.

Figure 7:
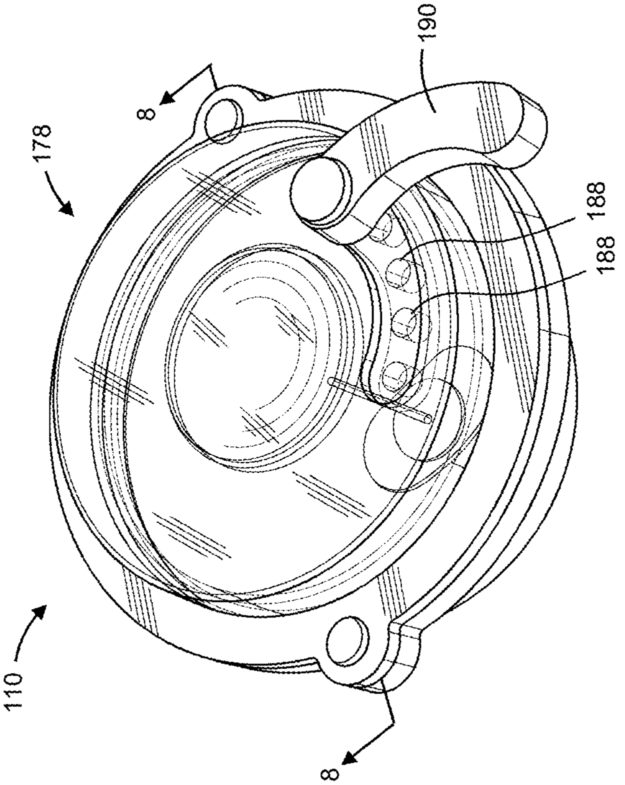
FIG. 7 is a perspective view of a display container of the display assembly of FIG. 1, with a plug portion of the container in an open position.

Referring to FIG. 7, in the example illustrated, the display container 110 includes a plurality of scent ports 188 extending between the interior 112 of the display container and environment, and a plug 190 sealing the scent ports 188. The plug 190 is movable away from the scent ports 188 to expose the scent ports 188 and facilitate sampling of an aroma of the articles 50 in the display container 110. In the example illustrated, the scent ports 188 are in the lid 178 of the display container 110, and the plug 190 is movably mounted to the lid 178.

Referring to FIG. 8, in the example illustrated, the display container 110 further includes a retainer 192 in the interior 112 of the display container 110 for retaining the article 50 at a predetermined location in the interior 112. In the example illustrated, the retainer 192 includes an elongate mounting projection 194. In the example illustrated, the mounting projection 194 is generally coaxial with the container axis 164. In the example illustrated, the elongate mounting projection comprises a spike for piercing the article 50.

Referring to FIG. 1, in the example illustrated, the display assembly 100 further includes an information display system 196 supported by the display stand 102 adjacent the display container 110 for displaying information about the articles 50 in the display container 110. In the example illustrated, the display system 196 is mounted to the base 104. In the example illustrated, the information display system 196 includes at least one card holder 198 shaped to receive and hold an information card providing the information about the articles 50. In the example illustrated, the card holder 198 comprises a transparent wall defining a card slot 202 for receiving and holding the information card.

Figure 9:
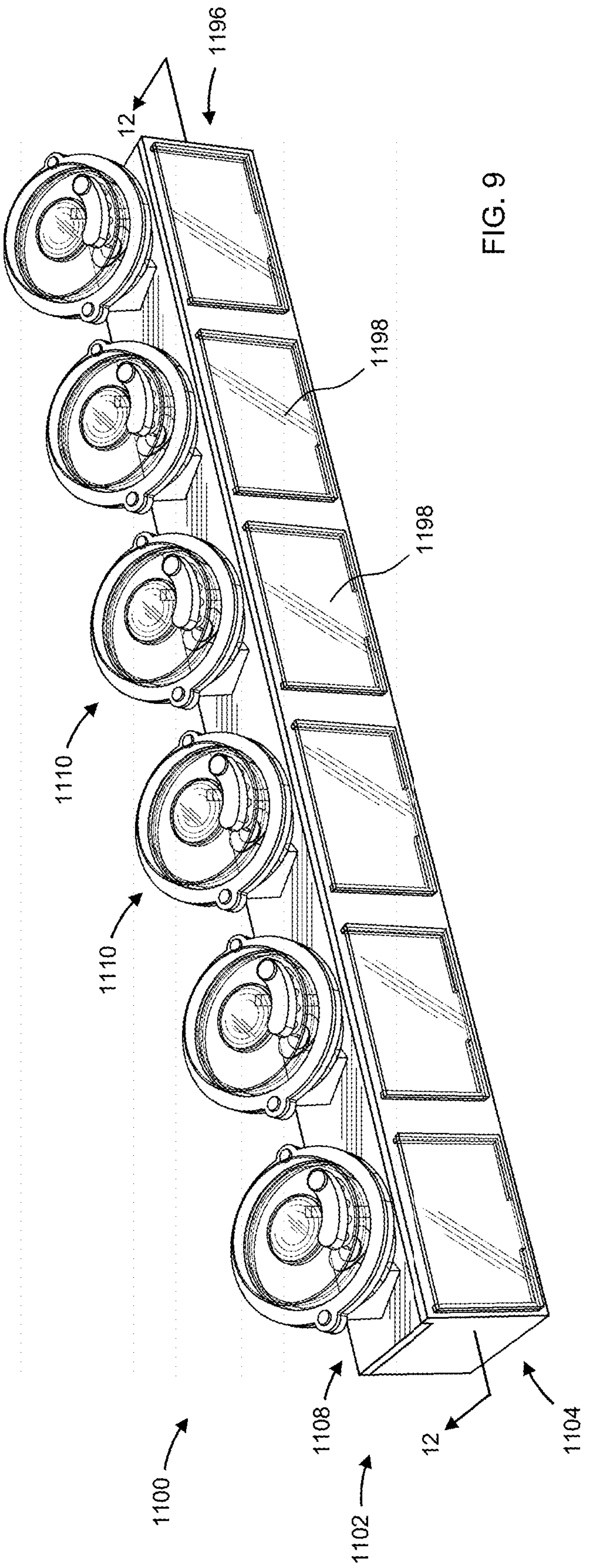
FIG. 9 is a perspective view from the top and front of another example display assembly.

Referring to FIG. 9, another example display assembly 1100 is illustrated. The display assembly 1100 has similarities to the display assembly 100, and like features are identified using like reference characters, incremented by 1000.

Figure 10:
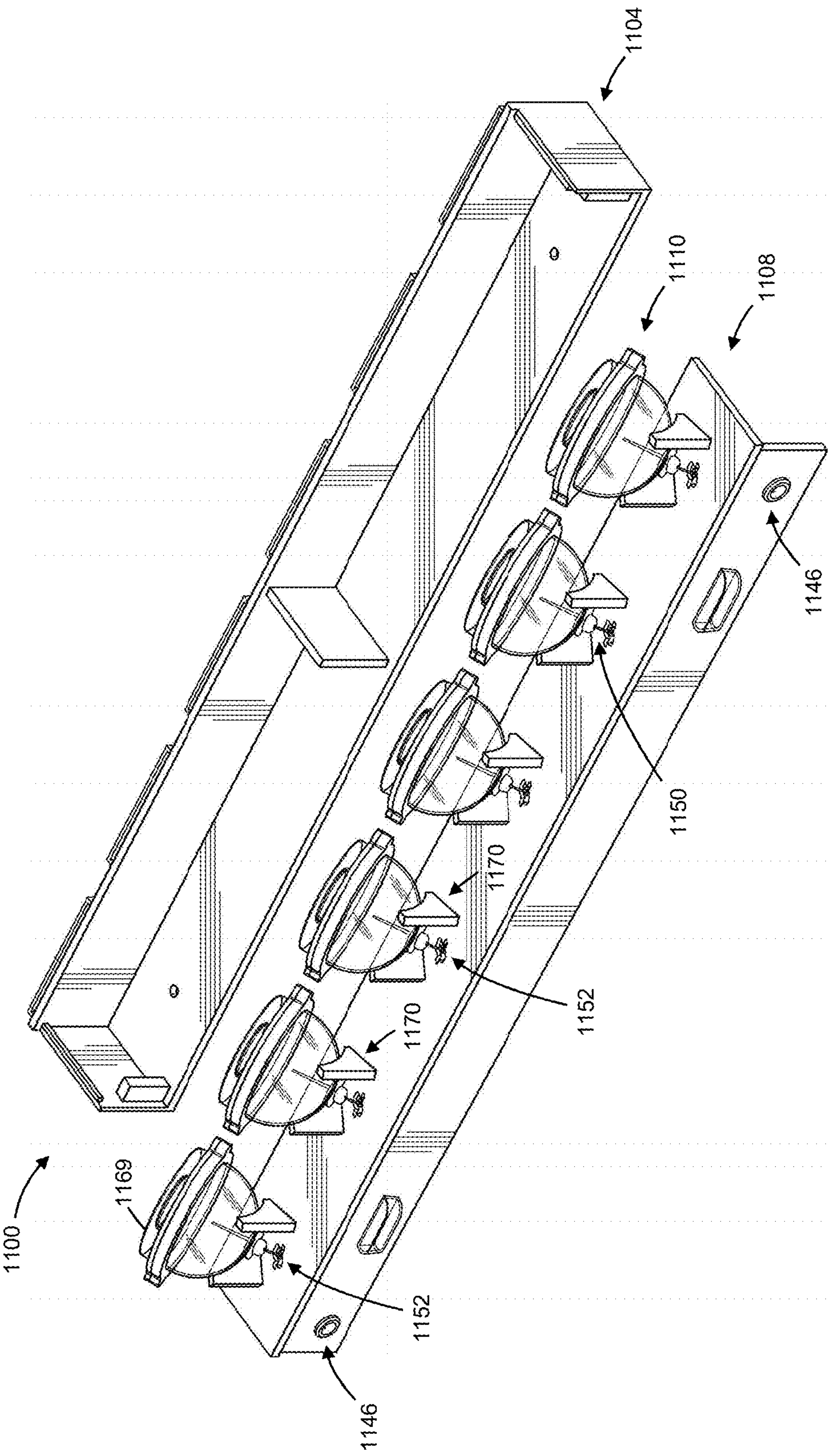
FIG. 10 is a perspective view from the rear and top showing a platform portion detached from a base portion of the display assembly of FIG. 9.
Figure 11:
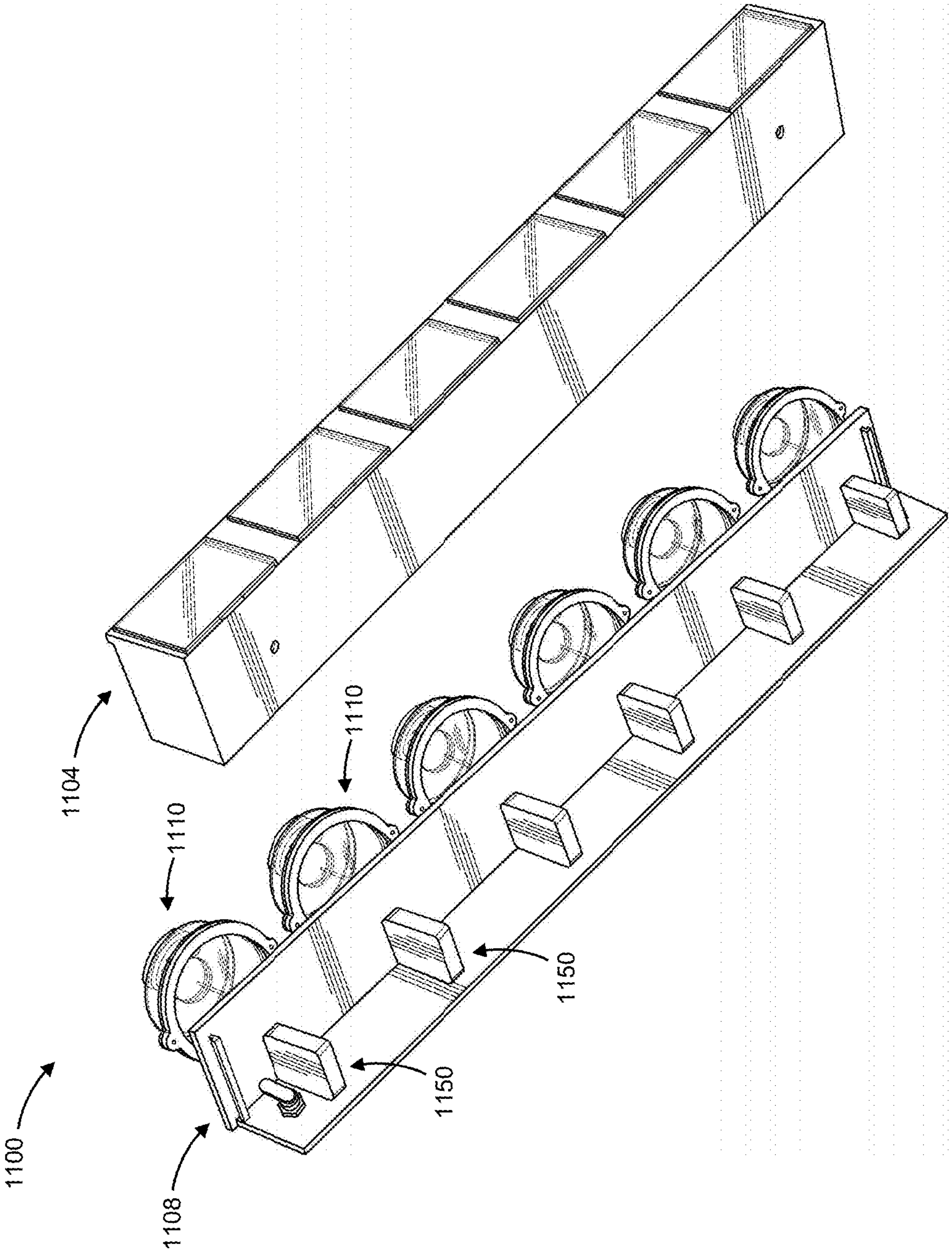
FIG. 11 is a perspective view from the front and bottom showing the platform portion detached from the base portion of the display assembly of FIG. 9.

In the example illustrated, the display assembly 1100 includes a display stand 1102 having a base 1104 securable to a secure support surface and a platform 1108 detachably mounted to the base 1104. In the example illustrated, a plurality of display containers 1110 are supported atop and fastened to the platform 1108. Referring to FIG. 11, in the example illustrated, a plurality of retractable security tethers 1150 are mounted to the platform 1108. Each tether 1150 securely fastens a corresponding display container 1110 to the platform 1108. Referring to FIG. 10, in the example illustrated, the display assembly 1100 includes a plurality of tether ports 1152 extending between an interior and an exterior of the display stand 1102. In the example illustrated, the retractable tethers 1150 are mounted to the platform 1108 in the interior and each tether 1150 extends through a corresponding tether port 1152 to a corresponding display container 1110.

Referring to FIG. 10, in the example illustrated, the platform 1108 includes a plurality of seats 1170, each seat 1170 shaped for supporting a corresponding display container 1110. In the example illustrated, when the display container 1110 is in the seat 1170, the seat 1170 and the retractable tether 1150 cooperate to hold the display container 1110 at an angled orientation, in which a transparent viewing surface 1169 of the display container 1110 is inclined from horizontal toward the front of the display stand 1102 (to angle the viewing surface 1169 toward patrons when the container is in the seat 1170).

Figure 12:
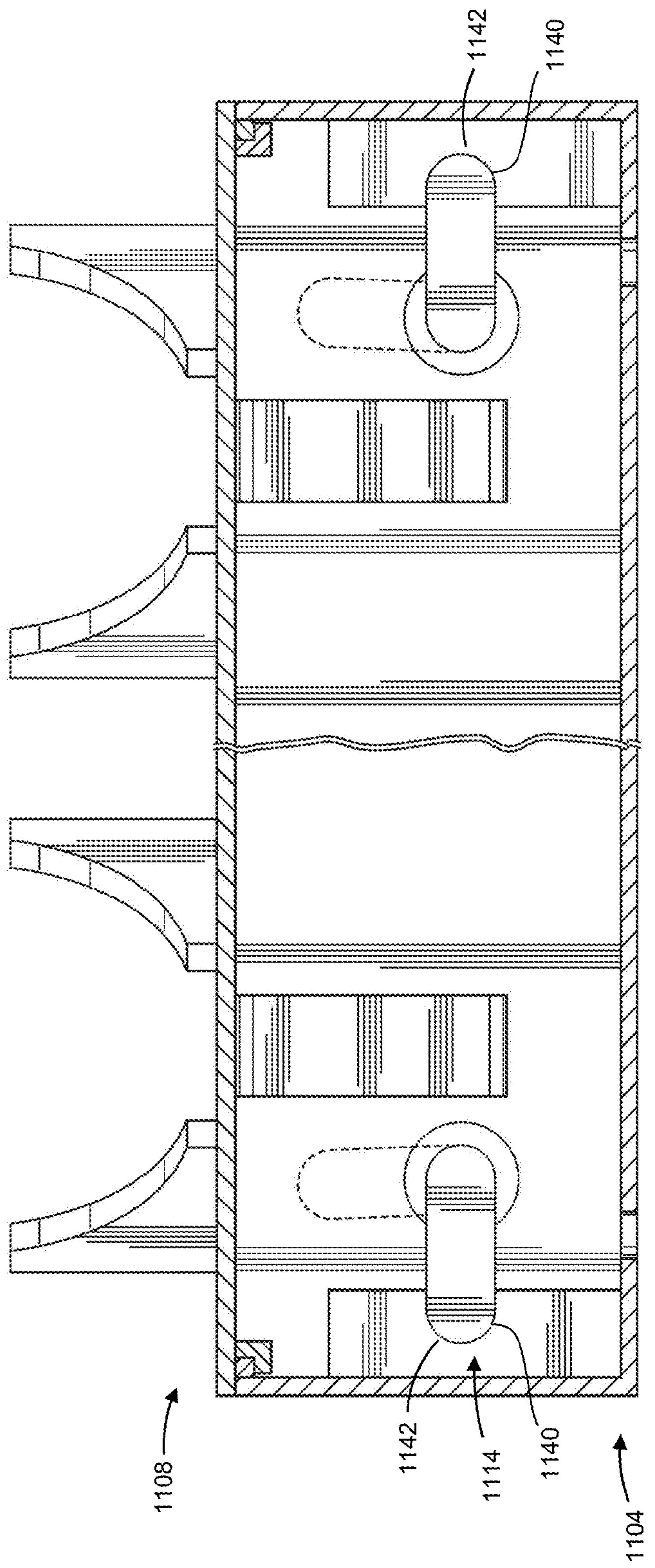
FIG. 12 is a cross-sectional view of a display stand portion of the display assembly of FIG. 9, taken along line 12-12 in FIG. 9.

Referring to FIG. 12, in the example illustrated, a locking mechanism 1114 is mounted to the display stand 1102, and movable between a locked position and an unlocked position. When the locking mechanism 1114 is in the locked position, the platform 1108 is securely locked to the base 1104. When the locking mechanism 1114 is in the unlocked position, the platform 1108 is unlocked from the base 1104 to permit detachment of the platform from the base for transporting the platform 1108 and the plurality of display containers 1110 fastened to the platform 1108 away from the base 1104.

In the example illustrated, the locking mechanism 1114 includes a pair of laterally spaced apart latches 1140 movably mounted to the platform 1108, and a pair of laterally spaced apart corresponding strike surfaces 1142 fixed relative to the base 1104. The strike surfaces 1142 are positioned for engagement by the latches 1140 when the platform 1108 is mounted to the base 1104 and the locking mechanism 1114 is in the locked position, to prevent detachment of the platform 1108 from the base 1104. The latches 1140 are clear of the strike surfaces 1142 when the locking mechanism 1114 is in the unlocked position to permit the platform 1108 to be mounted to and detached from the base 1104. Referring to FIG. 10, in the example illustrated, the locking mechanism 1114 includes a pair of key slots 1146, each key slot 1146 for actuating a corresponding latch 1140 independently.

Referring to FIG. 9, in the example illustrated, the display assembly 1100 further includes an information display system 1196 supported by the display stand 1102 adjacent the display containers 1110 for displaying information about the articles 50 containable in the display containers 1110. In the example illustrated, the information display system 1196 includes a plurality of card holders 1198. Each card holder 1198 is adjacent a corresponding display container 1110 and is shaped to receive and hold an information card providing information about articles 50 containable in that display container 1110. In the example illustrated, the card holders 1198 are supported by the display stand 1102 in front of and at an elevation below the display containers 1110.

Figure 13:
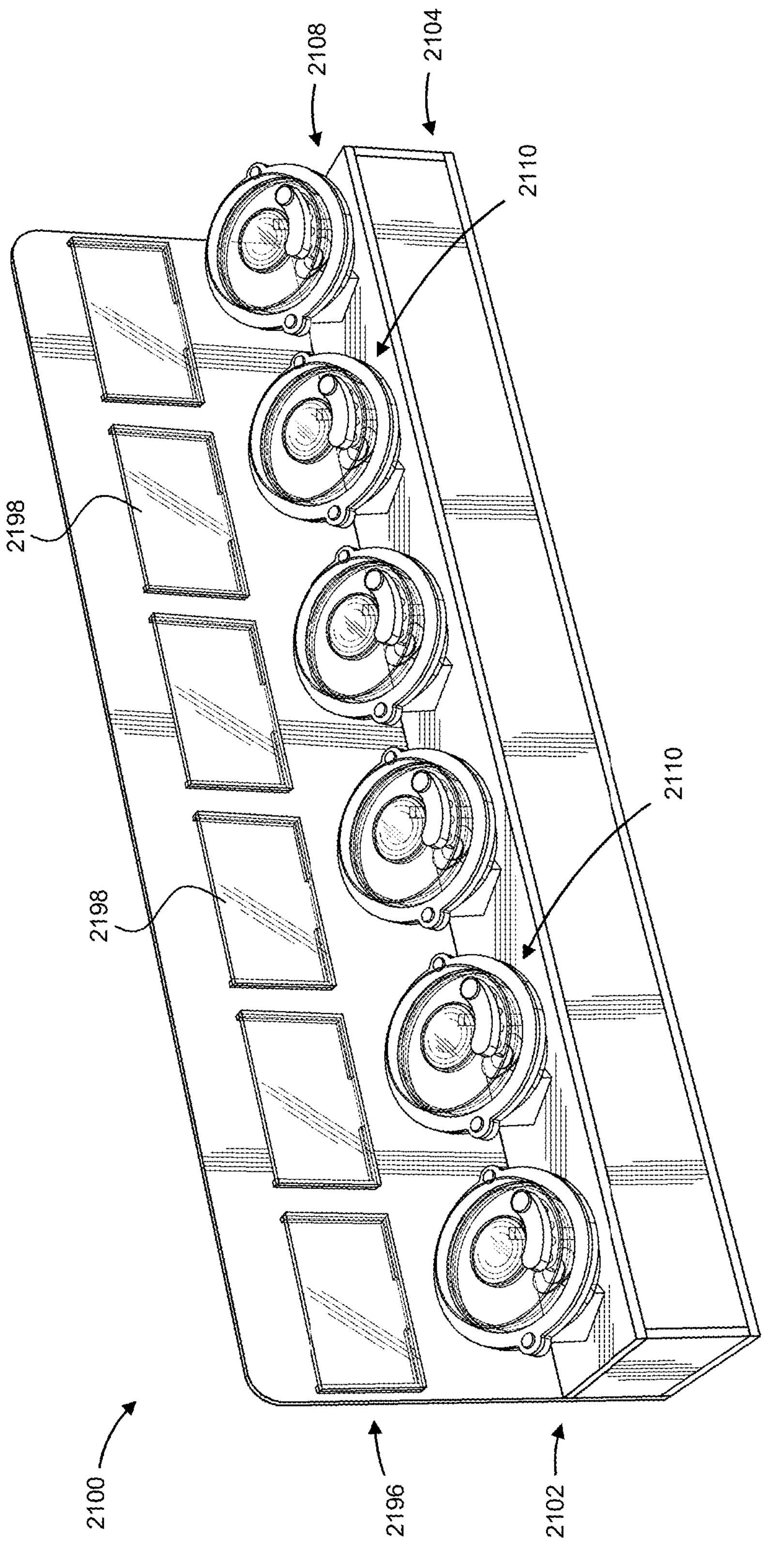
FIG. 13 is a perspective view from the top and front of another example display assembly.

Referring to FIG. 13, another example display assembly 2100 is illustrated. The display assembly 2100 has similarities to the display assembly 1100, and like features are identified using like reference characters, incremented by 1000.

In the example illustrated, the display assembly 2100 includes a display stand 2102 having a base 2104 securable to a secure support surface and a platform 2108 detachably mounted to the base 2104. A plurality of display containers 2110 are supported atop and fastened to the platform 2108 through corresponding tethers (e.g. similar to tethers 1150) mounted to the platform 2108. In the example illustrated, the display assembly 2100 further includes an information display system 2196 supported by the display stand 2102 adjacent the display containers 2110 for displaying information about the articles 50 containable in the display containers 2110. In the example illustrated, the information display system 2196 includes a plurality of card holders 2198, each card holder 2198 for receiving a corresponding information card. In the example illustrated, the card holders 2198 are supported by the display stand 2102 behind and at an elevation above the display containers 2110.

Figure 14:
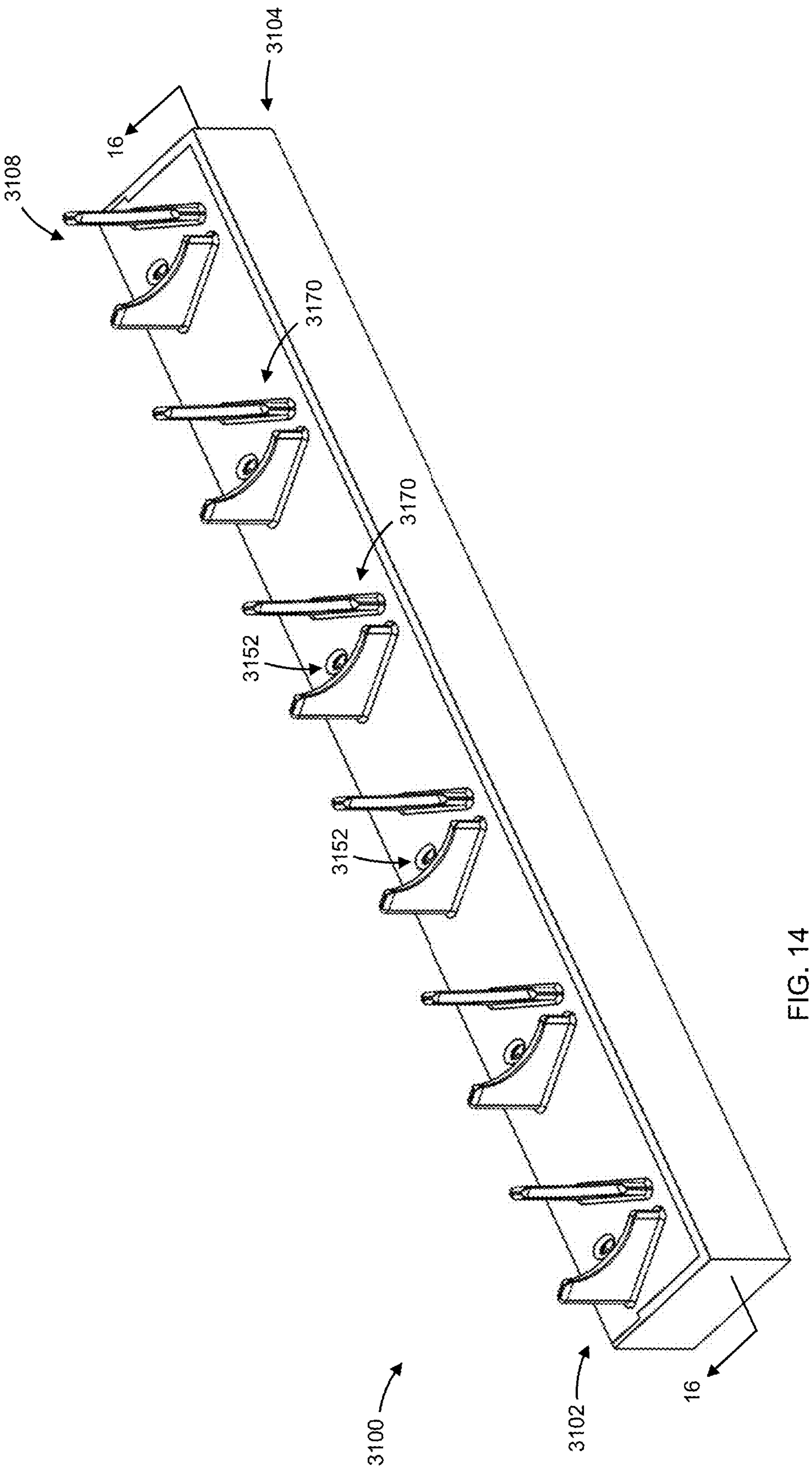
FIG. 14 is a perspective view from the top and front of another example display assembly.

Referring to FIG. 14, another example display assembly 3100 is illustrated. The display assembly 3100 has similarities to the display assembly 100, and like features are identified using like reference characters, incremented by 3000.

Figure 16:
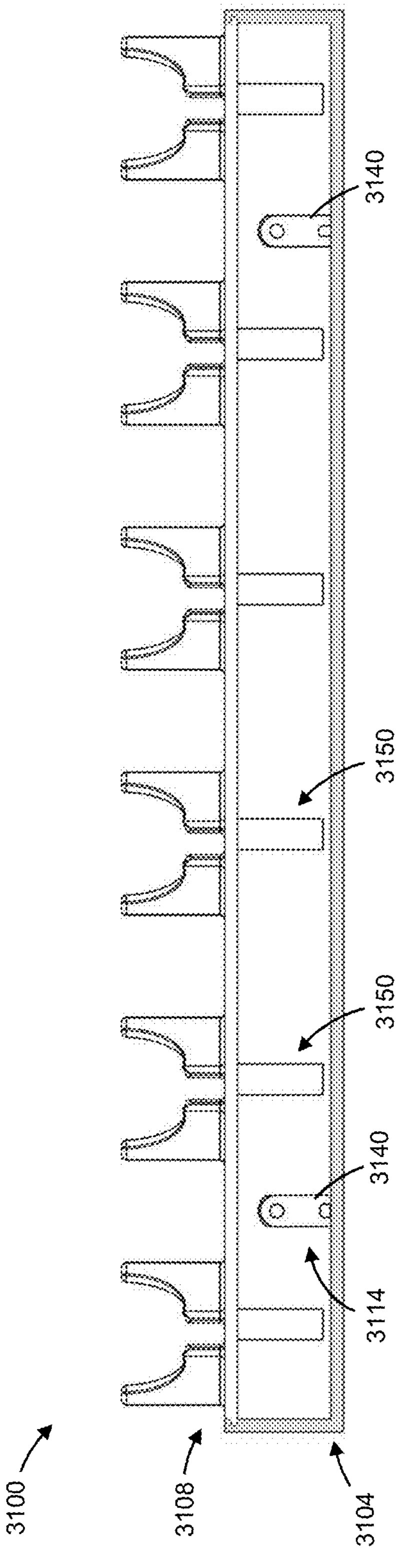
FIG. 16 is a cross-sectional view of the display assembly of FIG. 14, taken along line 16-16 in FIG. 14.

The display assembly 3100 includes a display stand 3102 having a base 3104 securable to a secure support surface and a platform 3108 detachably mounted to the base 3104. Referring to FIG. 16, in the example illustrated, a plurality of retractable security tethers 3150 are mounted to the platform 3108. Each tether 3150 is for securely fastening a corresponding display container (like the container 110) to the platform 3108. Referring to FIG. 14, in the example illustrated, the display assembly 3100 includes a plurality of tether ports 3152 extending between an interior and an exterior of the display stand 3102. In the example illustrated, the retractable tethers 3150 are mounted to the platform 3108 in the interior and each tether 3150 is extendable through a corresponding tether port 3152 to a corresponding display container. In the example illustrated, the platform 3108 includes a plurality of seats 3170, each seat 3170 shaped for supporting a corresponding display container at an angled orientation (e.g. similar to that shown in FIG. 1 for the display container 110).

Referring to FIG. 16, in the example illustrated, a locking mechanism 3114 is mounted to the display stand 3102. The locking mechanism 3114 is moveable between a locked position and an unlocked position. When the locking mechanism 3114 is in the locked position, the platform 3108 is securely locked to the base 3104. When the locking mechanism 3114 is in the unlocked position, the platform 3108 is unlocked from the base 3104 to permit detachment of the platform 3108 from the base for transporting the platform 3108 and the plurality of the display containers fastened to the platform 3108 away from the base 3104.

Figure 15:
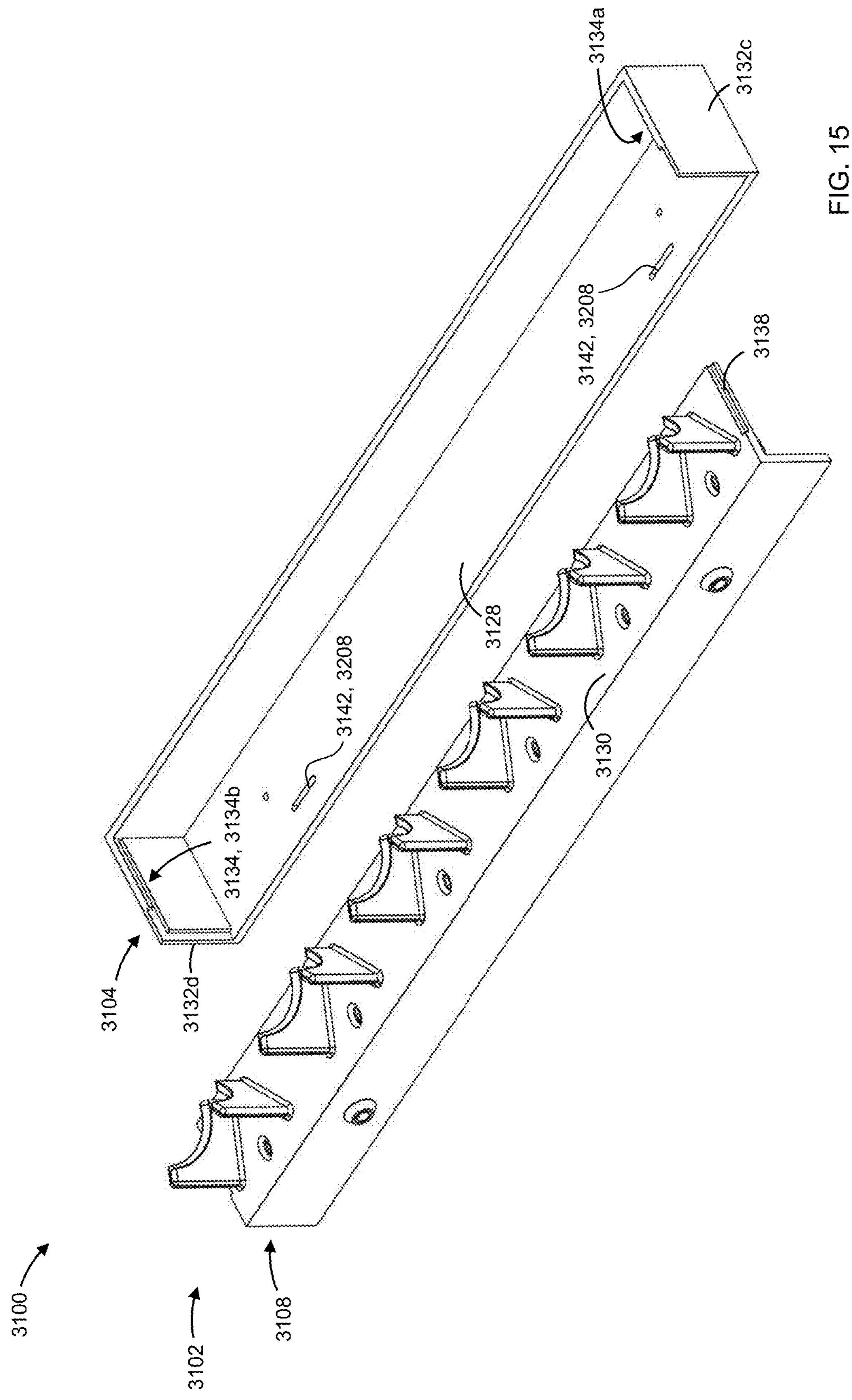
FIG. 15 is a perspective view from the rear and top showing a platform portion detached from a base portion of the display assembly of FIG. 14.

In the example illustrated, the locking mechanism 3114 includes a pair of laterally spaced apart latches 3140 and a pair of corresponding strike surfaces 3142 fixed relative to the base 3104 for engagement by the latches 3140. In the example illustrated, the latches 3140 are mounted to the platform 3108. Referring to FIG. 15, in the example illustrated, each strike surface 3142 is defined by a corresponding opening 3208 in a bottom wall 3128 of the base 3104 for receiving a corresponding latch 3140.

Referring to FIG. 15, in the example illustrated, the base 3104 includes a track 3134 and the platform 3108 is slidably mounted on the track 3134. In the example illustrated, the platform 3108 includes one or more track engagement surfaces 3138 for interlocking with the track 3134 to constrain movement of the platform 3108 to along the track 3134. In the example illustrated, the track 3134 includes a first guide surface **3134*a* fixed relative to a sidewall left portion 3132*c* and a second guide surface 3134*b* fixed relative to a sidewall right portion 3132*d* of the base 3102. In the example illustrated, each guide surface 3134*a*, 3134*b* comprises a groove in an inner surface of the base 3104. In the example illustrated, each track engagement surface 3138 defines a ridge fixed relative to the top wall 3130 of the platform 3108** and slidable into a corresponding groove.

Figure 19:
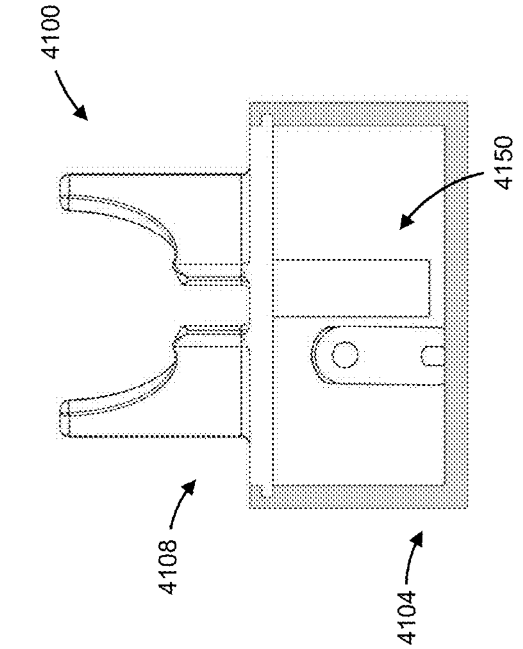
FIG. 19 is a cross-sectional view of the display assembly of FIG. 17, taken along line 19-19 in FIG. 17.
Figure 18:
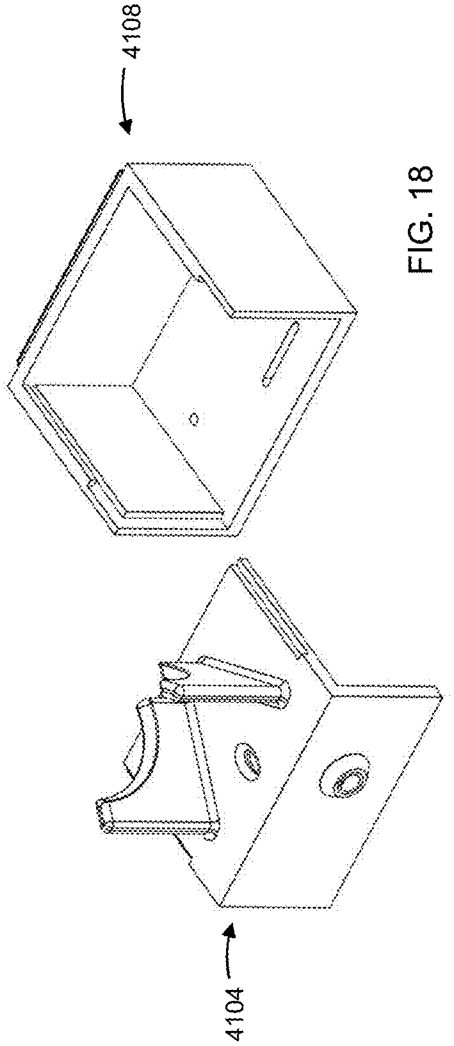
FIG. 18 is a perspective view from the rear and top showing a platform portion detached from a base portion of the display assembly of FIG. 17.
Figure 17:
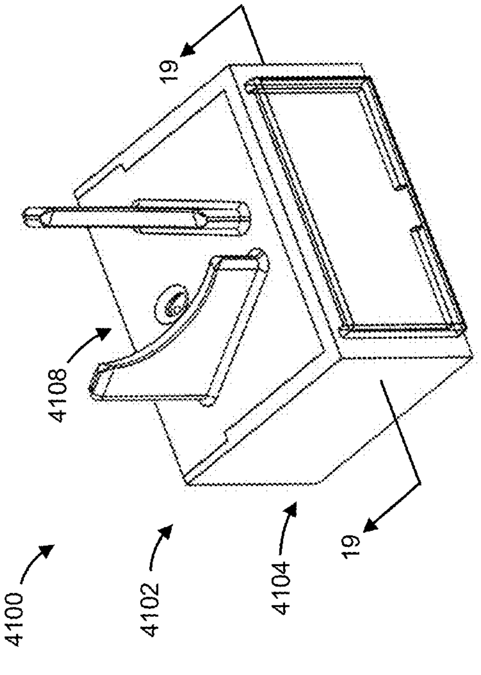
FIG. 17 is a perspective view from the top and front of another example display assembly.

Referring to FIGS. 17 to 19, another example display assembly 4100 is illustrated. The display assembly 4100 has similarities to the display assembly 3100, and like features are identified using like reference characters, incremented by 1000. The display assembly 4100 includes a display stand 4102 having a base 4104 securable to a secure support surface and a platform 4108 detachably mounted to the base 4104. In the example illustrated, a single retractable security tether 4150 is mounted to the platform 4108 (in an interior of the display stand) for securely fastening a single display container (like the container 110) to the platform 4108.

The invention claimed is:

1. A display assembly, comprising:

a) a display stand including a base securable to a secure support surface and a platform detachably mounted to the base, the base including one or more mounting features for securing the base to the support surface, the mounting features inaccessible when the base is secured to the support surface and the platform is mounted to the base, and the mounting features accessible when the platform is detached from the base;

b) at least one display container supported atop and securely fastened to the platform, at least a portion of the display container being generally transparent for viewing one or more articles containable therein for display; and c) a locking mechanism mounted to the display stand, the locking mechanism moveable between a locked position in which the platform is securely locked to the base to prevent detachment of the platform from the base, and an unlocked position in which the platform is unlocked from the base to permit detachment of the platform from the base for transporting the display container away from the base.

2. A display assembly, comprising:

a) a display stand including a base securable to a secure support surface and a platform detachably mounted to the base;

b) at least one display container supported atop and securely fastened to the platform, at least a portion of the display container being generally transparent for viewing one or more articles containable therein for display;

c) a locking mechanism mounted to the display stand, the locking mechanism moveable between a locked position in which the platform is securely locked to the base to prevent detachment of the platform from the base, and an unlocked position in which the platform is unlocked from the base to permit detachment of the platform from the base for transporting the display container away from the base; and d) at least one retractable tether securely fastening the display container to the platform, the retractable tether permitting limited movement of the display container away from the platform to facilitate viewing of the articles and urging the display container back to the platform.

3. The display assembly of claim 2, wherein the display stand has a generally enclosed interior bounded by the base and the platform, and at least one tether port extending between the interior and an exterior of the display stand, and wherein the retractable tether is mounted to the platform in the interior and extends through the tether port to the display container.

4. The display assembly of claim 3, wherein the retractable tether comprises a retraction mechanism mounted in the interior and a tether line extending through the tether port between a proximal end coupled to the retraction mechanism and a distal end fixed to the display container.

5. The display assembly of claim 2, wherein the display container extends along a container axis between a top portion and a bottom portion vertically opposite the top portion, the top portion comprising a generally transparent viewing surface normal to the container axis and through which the articles are viewable.

6. The display assembly of claim 5, wherein the platform comprises at least one seat shaped for supporting the bottom portion of the display container.

7. The display assembly of claim 6, wherein when the display container is in the seat, the seat and the retractable tether cooperate to hold the display container at an angled orientation, in which the viewing surface is inclined from horizontal toward the front of the display stand.

8. The display assembly of claim 6, wherein the bottom of the display container has a generally hemispherical shape, and the seat has an arcuate curvature corresponding to the hemispherical shape.

9. The display assembly of claim 5, wherein the viewing surface comprises a viewing lens.

10. A display assembly, comprising:

a) a display stand including a base securable to a secure support surface and a platform detachably mounted to the base;

b) at least one display container supported atop and securely fastened to the platform, at least a portion of the display container being generally transparent for viewing one or more articles containable therein for display, each display container having a generally enclosed interior for containing the one or more articles therein, and each display container having at least a first portion and a second portion detachably mounted and locked to the first portion to generally enclose the interior of the container, the second portion unlockable and detachable from the first portion to open the display container for insertion and removal of the one or more articles into and out from the interior of the display container; and c) a locking mechanism mounted to the display stand, the locking mechanism moveable between a locked position in which the platform is securely locked to the base to prevent detachment of the platform from the base, and an unlocked position in which the platform is unlocked from the base to permit detachment of the platform from the base for transporting the display container away from the base.

11. The display assembly of claim 10, wherein the locking mechanism is key-operated and includes a latch movably mounted to one of the base and the platform, and a strike surface fixed relative to the other one of the base and the platform, the latch positioned for engagement with the strike surface when the locking mechanism is in the locked position to prevent detachment of the platform from the base, and the latch clear of the strike surface when the locking mechanism is in the unlocked position to permit detachment of the platform from the base.

12. The display assembly of claim 10, wherein the base includes a track extending along a track axis and the platform is slidably mounted on the track for constraining movement of the platform to along the track axis.

13. The display assembly of claim 10, wherein the first portion comprises a base portion supportable atop the platform and the second portion comprises a lid portion.

14. The display assembly of claim 10, wherein the second portion includes a generally transparent viewing surface through which the one or more articles are viewable.

15. A display assembly, comprising:

a) a display stand including a base securable to a secure support surface and a platform detachably mounted to the base;

b) a plurality of display containers fastened to the platform, at least a portion of each display container being generally transparent for viewing one or more articles containable therein for display, each display container having a generally enclosed interior for containing the one or more articles therein; and c) a locking mechanism mounted to the display stand, the locking mechanism moveable between a locked position in which the platform is securely locked to the base to prevent detachment of the platform from the base, and an unlocked position in which the platform is unlocked from the base to permit detachment of the platform from the base for transporting the display containers away from the base.

16. The display assembly of claim 15, further comprising (d) a plurality of retractable tethers mounted to the platform, each tether securely fastening a corresponding display container to the platform, and each tether permitting limited movement of the corresponding display container away from the platform and urging the display container back toward the platform.

17. The display assembly of claim 16, wherein the display stand has a generally enclosed interior bounded by the base and the platform, and a plurality of tether ports extending between the interior and an exterior of the display stand, and wherein the retractable tethers are mounted to the platform in the interior and each tether extends through a corresponding tether port to a corresponding display container.

18. The display assembly of claim 15, wherein the platform comprises a plurality of seats, each seat shaped for supporting a corresponding display container.

19. The display assembly of claim 15, wherein each display container has at least a first portion and a second portion detachably mounted and locked to the first portion to generally enclose the interior, the second portion unlockable and detachable from the first portion to open the display container for insertion and removal of the one or more articles into and out from the interior of the display container.

20. A display assembly, comprising:

a) a housing having a generally enclosed interior;

b) at least one display container adjacent the housing, at least a portion of the display container being generally transparent for viewing one or more articles containable therein for display, each display container configured to securely enclose the one or more articles within the display container;

c) at least one tether port extending through the housing between the interior and an exterior of the housing; and d) at least one retractable tether mounted in the interior of the housing, the retractable tether extending through the tether port and fastening the display container to the housing, the tether permitting limited movement of the display container away from the housing to facilitate viewing of the articles, and urging the display container back toward the housing.

21. The display assembly of claim 20, wherein the housing includes a first portion securable to a secure support surface and a second portion detachably mounted to the first portion, the first and second portions bounding the interior of the housing, and wherein the tether port is provided in the second portion of the housing and the retractable tether is mounted to the second portion.

22. The display assembly of claim 21, wherein the first portion includes one or more mounting features for securing the first portion to the secure support surface, the mounting features inaccessible when the first portion is secured to the support surface and the second portion is mounted to the first portion, and the mounting features accessible when the second portion is detached from the first portion.

23. The display assembly of claim 21, further comprising a locking mechanism mounted to the housing, the locking mechanism moveable between a locked position in which the second portion is securely locked to the first portion to prevent detachment of the second portion from the first portion, and an unlocked position in which the second portion is unlocked from the first portion to permit detachment of the second portion from the first portion for transporting the second portion, the at least one retractable tether, and the at least one display container away from the first portion.

24. The display assembly of claim 20, wherein the housing includes a first portion securable to a secure support surface and a second portion detachably mounted to the first portion, the first and second portions bounding the interior of the housing, wherein the retractable tether is mounted to the second portion, and wherein the second portion is securely lockable to the first portion to prevent detachment of the second portion from the first portion, and selectively unlockable from the first portion to permit detachment and transport of the second portion, the at least one retractable tether, and the at least one display container away from the first portion.

25. The display assembly of claim 20, wherein each display container includes one or more scent ports for sampling an aroma of the one or more articles within the display container.

26. The display assembly of claim 20, wherein each display container has at least a first portion and a second portion detachably mounted and locked to the first portion, the second portion unlockable and detachable from the first portion to open the display container for insertion and removal of the one or more articles into and out from the display container.

27. The display assembly of claim 26, wherein the second portion of the display container is securely locked to the first portion through a container locking mechanism comprising one or more removable fasteners operable for locking and unlocking the first portion to the second portion.

28. The display assembly of claim 20, wherein the at least one display container comprises a plurality of display containers adjacent the housing, the at least one tether port comprises a plurality of tether ports extending through the housing, and the at least one retractable tether comprises a plurality of retractable tethers mounted in the interior of the housing, each retractable tether extending through a respective tether port and fastening a respective display container to the housing.

* * * * *